(12) United States Patent
Miyamoto

(10) Patent No.: US 8,761,275 B2
(45) Date of Patent: Jun. 24, 2014

(54) WIRELESS COMMUNICATION APPARATUS AND METHOD FOR WIRELESS COMMUNICATION

(75) Inventor: Shoichi Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 12/851,786

(22) Filed: Aug. 6, 2010

(65) Prior Publication Data

US 2010/0296596 A1 Nov. 25, 2010

Related U.S. Application Data

(63) Continuation of application No. PCT/JP2008/053763, filed on Mar. 3, 2008.

(51) Int. Cl.
*H04L 27/28* (2006.01)
*H04L 27/00* (2006.01)

(52) U.S. Cl.
USPC .......................................... 375/260; 375/295

(58) Field of Classification Search
USPC .......... 375/260, 267, 295, 299; 370/208, 210, 370/328, 334; 455/101–103
See application file for complete search history.

(56) References Cited

U.S. PATENT DOCUMENTS

| | | | |
|---|---|---|---|
| 6,081,536 A | 6/2000 | Gorsuch et al. | |
| 6,526,281 B1 | 2/2003 | Gorsuch et al. | |
| 7,263,133 B1 * | 8/2007 | Miao | 375/267 |
| 7,656,965 B2 * | 2/2010 | Shapira et al. | 375/299 |
| 8,027,392 B2 * | 9/2011 | Hara et al. | 375/260 |
| 2009/0022231 A1 * | 1/2009 | Ochiai et al. | 375/260 |
| 2009/0029710 A1 * | 1/2009 | Ochiai et al. | 455/450 |
| 2009/0046790 A1 * | 2/2009 | Soliman | 375/260 |
| 2009/0225666 A1 | 9/2009 | Ofuji et al. | |

FOREIGN PATENT DOCUMENTS

| | | |
|---|---|---|
| EP | 1850518 A1 | 10/2007 |
| JP | 2002510447 | 2/2002 |
| JP | 2003101499 | 4/2003 |
| JP | 2006013982 | 1/2006 |
| WO | 9859523 | 12/1998 |
| WO | 2007111186 A1 | 10/2007 |

OTHER PUBLICATIONS

International Preliminary Report on Patentability dated Oct. 21, 2010 received in PCT/JP2008/053763.
International Search Report dated Jun. 10, 2008 in corresponding International application No. PCT/JP2008/053763.
Notice of Reason for Rejection Japanese Office Action dated Jul. 3, 2012 received in corresponding Japanese Patent Application No. 2010-501700.
Extended European Search Report dated Jan. 24, 2014 received in Application No. 08721183.5.

* cited by examiner

*Primary Examiner* — Khanh C Tran
(74) *Attorney, Agent, or Firm* — Smith, Gambrell & Russell, LLP

(57) ABSTRACT

A wireless communication technology which realizes high-speed transmission while making effective use of existing frequency bands. A wireless communication apparatus includes a communication unit to perform a wireless communication with a target communication device by simultaneously using a plurality of carrier frequency bands each of which has a specified bandwidth and is discontinuous between each carrier frequency-band interval.

14 Claims, 16 Drawing Sheets

WIRELESS COMMUNICATION APPARATUS AND METHOD FOR WIRELESS COMMUNICATION

CROSS-REFERENCE TO RELATED APPLICATIONS

This is a continuation of Application PCT/JP2008/053763, filed on Mar. 3, 2008, now pending, the contents of which are herein wholly incorporated by reference.

FIELD

The present invention relates to a wireless communication technology, and more particularly, to a technique of utilizing a plurality of carrier frequency bands.

BACKGROUND

Mobile communication systems have a tendency toward a larger traffic amount of data communication, and services to be provided are becoming more sophisticated. Therefore, there has been an increasing demand for high-speed radio transmission.

A frequency band allocable to the mobile communication system is limited, and hence there are provided various kinds of schemes as a technique for realizing high-speed radio transmission while effectively utilizing frequencies. Examples thereof include multi-level modulation such as 16 quadrature amplitude modulation (QAM) or 64QAM, and multiple input multiple output (MIMO) transmission. Further, high-speed transmission is more realizable as an available continuous bandwidth becomes larger, and hence the frequency bandwidth itself is an important factor for realizing high-speed transmission.

Carriers, which are operators of the mobile communication systems, are each allocated a predetermined frequency band. Each of the carriers uses the frequency band thus allocated, to thereby provide a plurality of mobile communication services in its own mobile communication system.

The following document discloses a technology of dynamically changing a bandwidth allocated to a subscriber unit based on a data transfer rate for the purpose of realizing high-speed transmission in a mobile communication system using a code division multiple access (CDMA) scheme.

[Patent document 1] Japanese National Publication of International Patent Application No. 2002-510447

SUMMARY

In order to realize high-speed transmission by dynamically changing a bandwidth allocated to each mobile terminal as in the conventional technology described above, it is necessary to have a large available continuous bandwidth.

However, it is difficult to secure a large continuous band within the frequency band allocated to each carrier. In reality, each carrier has different frequency bands in order to realize a plurality of mobile communication services.

In Japan, for example, the carriers are each supposed to be newly allocated an 800-MHz band, a 1.7-GHz band (Tokyo, Nagoya, and Osaka), and a 2-GHz band for a third generation (3G) system. Each carrier has already been operating existing mobile communication services by using the bands that have already been allocated, and hence it is difficult to allocate a new transmission scheme for high-speed transmission to the whole of the bands including such newly allocated bands. Each carrier therefore needs to execute the new transmission scheme for high-speed transmission by utilizing the newly allocated bands while continuing to operate the existing mobile communication services.

In order to solve the problem described above, the following configurations are adopted as aspects of the present invention.

According to a first aspect, there is provided a wireless communication apparatus, including a communication unit that performs wireless communication to one target communication device by simultaneously using a plurality of carrier frequency bands each having a specified bandwidth, the plurality of carrier frequency bands being discontinuous therebetween.

According to the first aspect, by simultaneously using a plurality of specified bandwidths in idle frequency bands discovered from among the target discontinuous frequency bands, it is possible to realize high-speed transmission of the same level as in the case where a continuous frequency band is used without securing any continuous frequency band in the same frequency band.

Accordingly, by utilizing the newly and partially secured frequency bands, it is possible to realize next-generation high-speed transmission communication such as Long Term Evolution (LTE) without affecting the communication bands applied to the communication services that are being operated by using the existing communication scheme such as 3G.

According to the first aspect, the communication unit preferably includes: a baseband processing unit that generates a first baseband multicarrier signal corresponding to a bandwidth of a first carrier frequency band in the plurality of carrier frequency bands, and a second baseband multicarrier signal corresponding to a bandwidth of a second carrier frequency in the plurality of carrier frequency bands; a first radio transmission unit that generates a radio signal of the first carrier frequency band based on the first baseband multicarrier signal; and a second radio transmission unit that generates a radio signal of the second carrier frequency band based on the second baseband multicarrier signal.

In this configuration, the first radio transmission unit and the second radio transmission unit that generate high-frequency radio signals are provided in correspondence with the discontinuous carrier frequency bands as described above, respectively. The baseband processing unit similarly provided to the communication unit generates the first baseband multicarrier signal and the second baseband multicarrier signal corresponding to the bandwidths of the respective carrier frequency bands. The first baseband signal and the second baseband signal thus generated are sent to the first radio transmission unit or the second radio transmission unit that correspond to the carrier frequency bands thereof, respectively.

According to this configuration, the baseband processing unit can be shared even in the case where the plurality of carrier frequency bands that are discontinuous therebetween are used, and the circuit scale of the wireless communication apparatus can in turn be reduced, which results in higher cost efficiency.

Further, according to the first aspect, the baseband processing unit preferably includes: a first IFFT unit that generates a first baseband orthogonal frequency division multiplexing (OFDM) signal as the first baseband multicarrier signal by performing IFFT processing based on an inverse fast Fourier transform (IFFT) size corresponding to the bandwidth of the first carrier frequency band; and a second IFFT unit that generates a second baseband OFDM signal as the second baseband multicarrier signal by performing IFFT processing based on an IFFT size corresponding to the bandwidth of the second carrier frequency band. This is a configuration example in a case where OFDM is employed as a multiplexing scheme for LTE.

In this configuration, when IFFT sizes corresponding to the target bandwidths are set, the shared baseband processing unit generates signals corresponding to the respective carrier frequency bands. For example, when the IFFT size is parameterized to enable setting change therefor, the IFFT processing can be performed with respect to arbitrary bands on one circuit board.

Therefore, according to this configuration, the baseband processing unit can be shared.

Further, according to the first aspect, the wireless communication apparatus further preferably includes an interface unit that connects the baseband processing unit to the first radio transmission unit and the second radio transmission unit by using predetermined interface signals. The interface unit preferably includes: an assignment unit that assigns the first baseband multicarrier signal and the second baseband multicarrier signal, which are output from the baseband processing unit, to the first radio transmission unit or the second radio transmission unit based on the plurality of carrier frequency bands; and an interface signal generation unit that maps, based on an assignment result obtained by the assignment function unit, the first baseband multicarrier signal and the second baseband multicarrier signal to the predetermined interface signals.

In this configuration, the interface unit performs assignment processing for the respective baseband multicarrier signals, and mapping processing therefor to their predetermined interface signals.

Accordingly, this configuration is suitable for such a case where the baseband processing unit is desired to be installed apart from the first radio transmission unit and the second radio transmission unit.

Further, according to the first aspect, the baseband processing unit further preferably includes a scheduling unit that allocates a data symbol addressed to the one target communication device to at least one of the first baseband multicarrier signal and the second baseband multicarrier signal.

In this configuration, the shared baseband processing unit is provided with the scheduling unit. The baseband processing unit handles the plurality of carrier frequency bands as described above.

Accordingly, the scheduling unit can freely set a frequency band and a bandwidth to be used even in a case where a plurality of carrier frequency bands are handled with regard to carrier allocation control for the data symbol addressed to the one target communication device.

Further, according to the first aspect, the scheduling unit further preferably includes a notification unit that newly allocates an idle carrier frequency band of the plurality of carrier frequency bands as a radio resource for the one target communication device, and notifies the one target communication device of band information on the newly allocated idle carrier frequency band. In this regard, the baseband processing unit may further include a control unit that receives, from the one target communication device, a notification regarding band information on a newly allocated carrier frequency band in the plurality of carrier frequency bands, and performs predetermined setting on generation of the first baseband multicarrier signal and the second baseband multicarrier signal based on the newly allocated band information.

According to this configuration, in a case where a band addition request is desired in the wireless communication apparatus, it is possible to perform dynamic allocation of the carrier frequency bands that are discontinuous therebetween.

Conversely, in a case where the band addition request is issued from the one target wireless communication apparatus, it is possible to dynamically allocate a necessary band from among the plurality of carrier frequency bands.

It should be noted that the description has been given that the first aspect is suitable for the case where the discontinuous carrier frequency bands are used, but the first aspect is applicable to the case where the continuous band is used. Thus, according to the first aspect, it is possible to utilize a single wireless communication apparatus for both the case where the discontinuous carrier frequency bands are used and the case where the continuous band is used.

It should be noted that the present invention may provide as another aspect thereof a method for implementing any one of the features described above in the wireless communication apparatus. Further, as the another aspect, the present invention may provide a program for implementing any one of the features described above, or a computer-readable storage medium having such a program recorded thereon.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
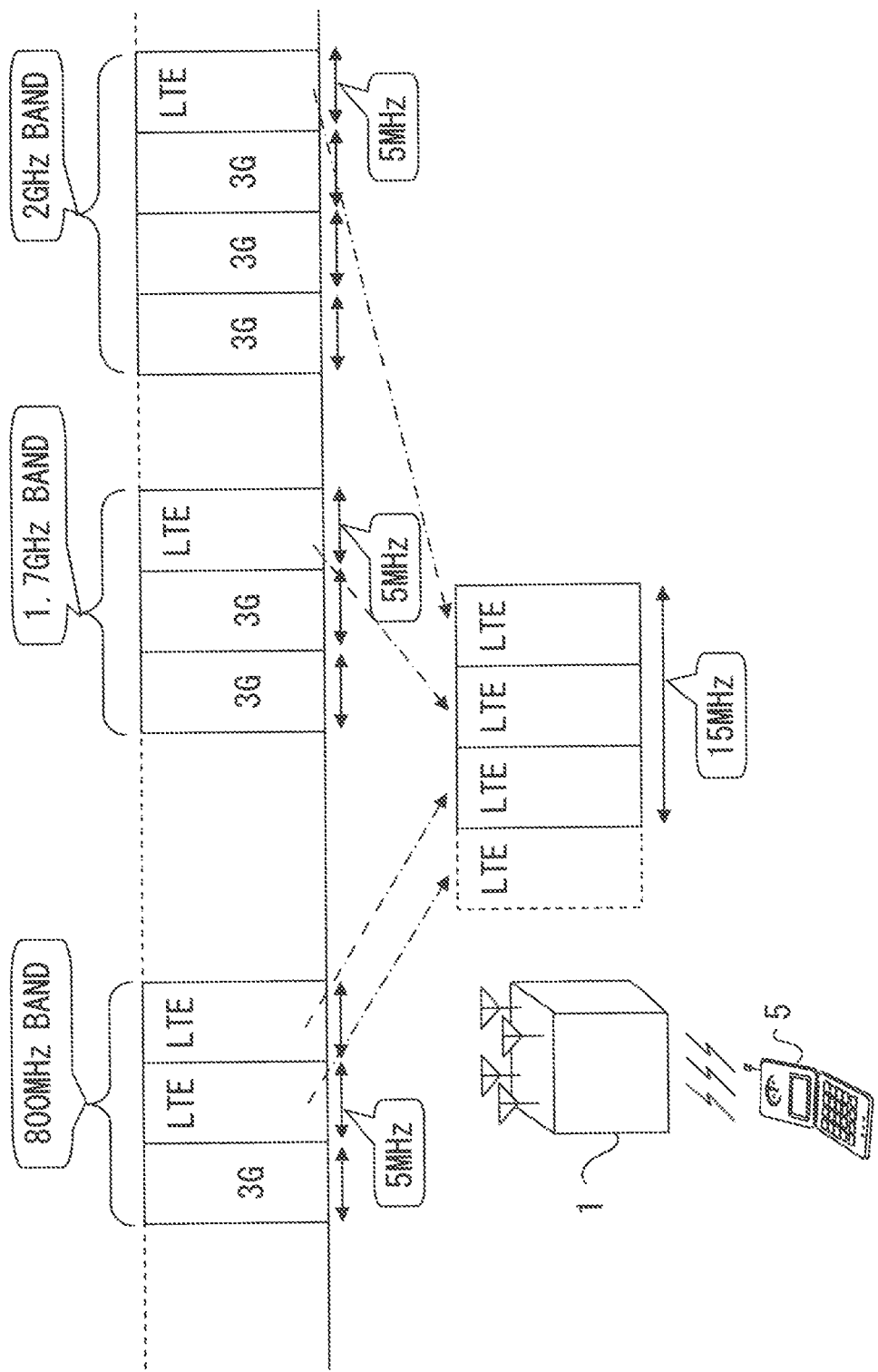
FIG. 1 is a conceptual diagram illustrating an example of a communication scheme employed for a mobile communication system according to a first embodiment.

Referring to the drawings, description is given below of a mobile communication system according to each embodiment. It should be noted that described below are exemplary configurations of the embodiments, and the present invention is not limited to the configurations of the embodiments described below.

First Embodiment

A mobile communication system according to a first embodiment is described below.

[System Configuration]

First, a system configuration of the mobile communication system according to the first embodiment is described with reference to FIG. 1. FIG. 1 is a conceptual diagram illustrating an example of a communication scheme employed for the mobile communication system according to the first embodiment. The mobile communication system of the first embodiment includes a plurality of base stations (for example, base station 1 illustrated in FIG. 1) (Node B or evolved Node B (eNB)) each connected to a network (not shown). A mobile terminal 5 such as a cellular phone performs wireless communication to the nearest base station 1 to establish connection to the mobile communication system of this embodiment, thereby receiving communication services provided therethrough, such as a telephone call service.

[Overview of Communication Scheme of First Embodiment]

Hereinbelow, description is given of a concept of the communication scheme executed in the mobile communication system of the first embodiment. As illustrated in FIG. 1, for example, it is assumed that predetermined bandwidths are allocated to the mobile communication system in an 800-MHz band, a 1.7-GHz band, and a 2-GHz band serving as available frequency bands. It is also assumed that, among those frequency bandwidths, for example, 5 MHz in the 800-MHz band, 5 MHz in the 1.7-GHz band, and 15 MHz in the 2-GHz band are used for operation of existing 3 G communication services.

Under such a situation, in the mobile communication system of the first embodiment, 10 MHz in the 800-MHz band, 5 MHz in the 1.7-GHz band, and 5 MHz in the 2-GHz band are newly allocated and used for executing a new communication scheme called "Long Term Evolution (LTE)" or "Super 3G". The new communication scheme is hereinafter referred to as "LTE communication scheme". The mobile communication system of the first embodiment realizes a communication scheme that does not affect the communication services operated by using the existing 3 G communication scheme while realizing high-speed transmission by executing the LTE communication scheme.

As described above, in order to realize high-speed transmission without applying this embodiment, a continuous frequency in the same frequency band is necessary. However, in order to secure a continuous frequency band, it is necessary to utilize a band used for the 3 G communication services that have already been in operation as well. In this case, the existing 3 G communication services are affected, and hence the mobile communication system of the first embodiment employs a frequency aggregation scheme. Hereinbelow, the frequency aggregation employed in this embodiment is described.

In the mobile communication system of the first embodiment, by aggregating frequencies having a predetermined bandwidth in different frequency bands instead of securing the continuous frequency in the same frequency band, the mobile communication system produces the same effect as in the case where the continuous frequency band is used. In the example of FIG. 1, the newly allocated 5 MHz in the 800-MHz band, 5 MHz in the 1.7-GHz band, and 5 MHz in the 2-GHz band are aggregated to obtain 15 MHz, which is used for wireless communication between the base station 1 and the mobile terminal 5.

It should be noted that the frequency aggregation of this embodiment only needs to avoid affecting the existing 3 G communication services and to use bands secured for the LTE communication scheme, and does not pose any limitation on specific usage of the different frequency bands. For example, in the LTE communication scheme, 10 MHz in the 800-MHz band, 5 MHz in the 1.7-GHz band, and 5 MHz in the 2-GHz band may be aggregated to obtain 20 MHz for use, or 10 MHz in the 1.7-GHz band and 5 MHz in the 2-GHz band may be aggregated to obtain 15 MHz for use. Further, bands spaced apart from each other in the same frequency band may be aggregated, for example, 5 MHz ranging from 800 MHz to 805 MHz and 5 MHz ranging from 835 MHz to 840 MHz.

Further, the mobile communication system of this embodiment may employ both the frequency aggregation and the conventional band addition function. Specifically, in a case where there is an idle band in the same frequency band, a continuous frequency band in the 800-MHz band may be used. Still further, the frequency bands to be subjected to the frequency aggregation are not limited to those in the example of FIG. 1, that is, the 800-MHz band, the 1.7-GHz band, and the 2-GHz band.

Figure 2:
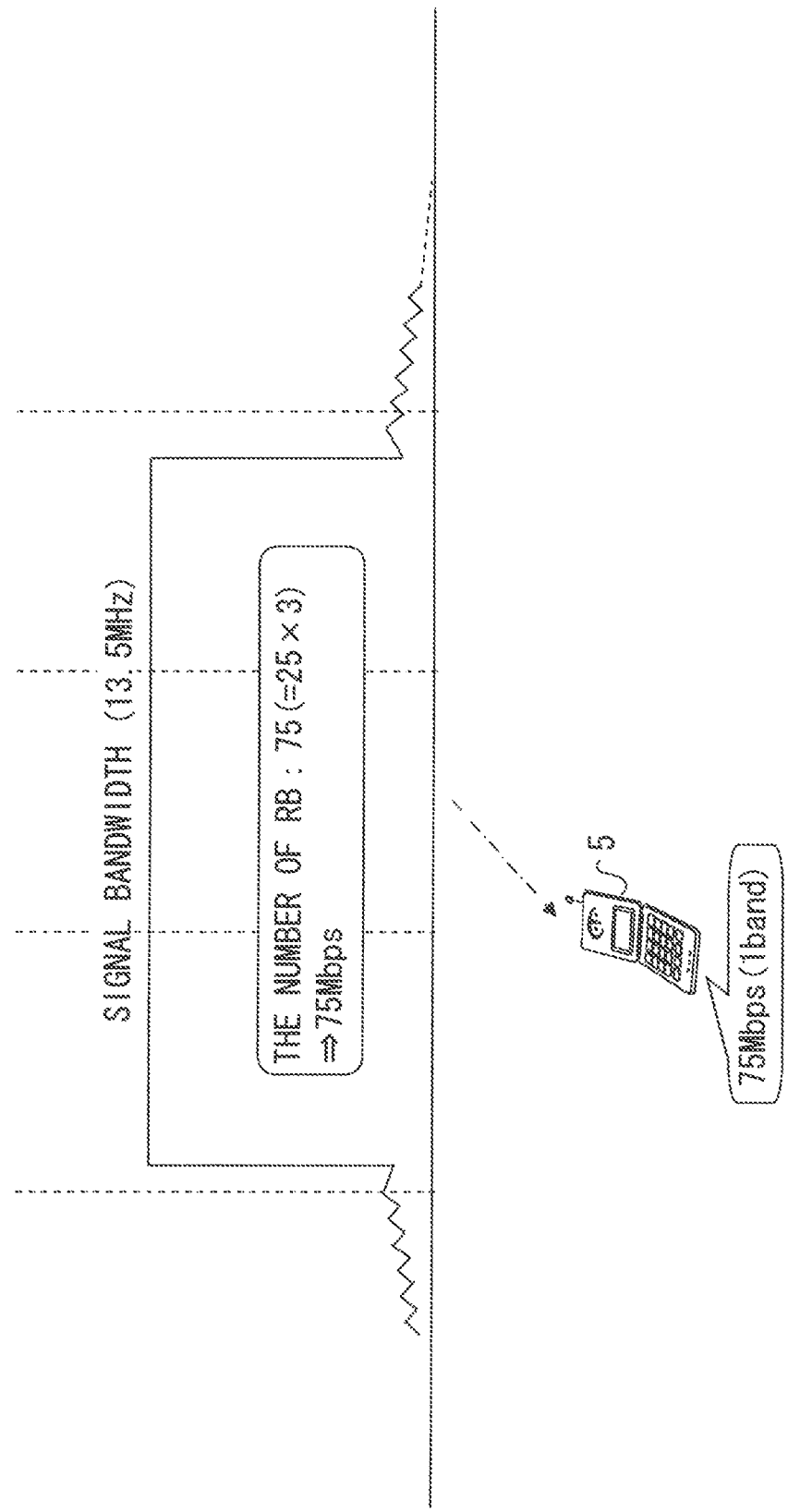
FIG. 2 is a conceptual diagram illustrating a transfer rate of a communication scheme using a continuous frequency in the same frequency band.
Figure 3:
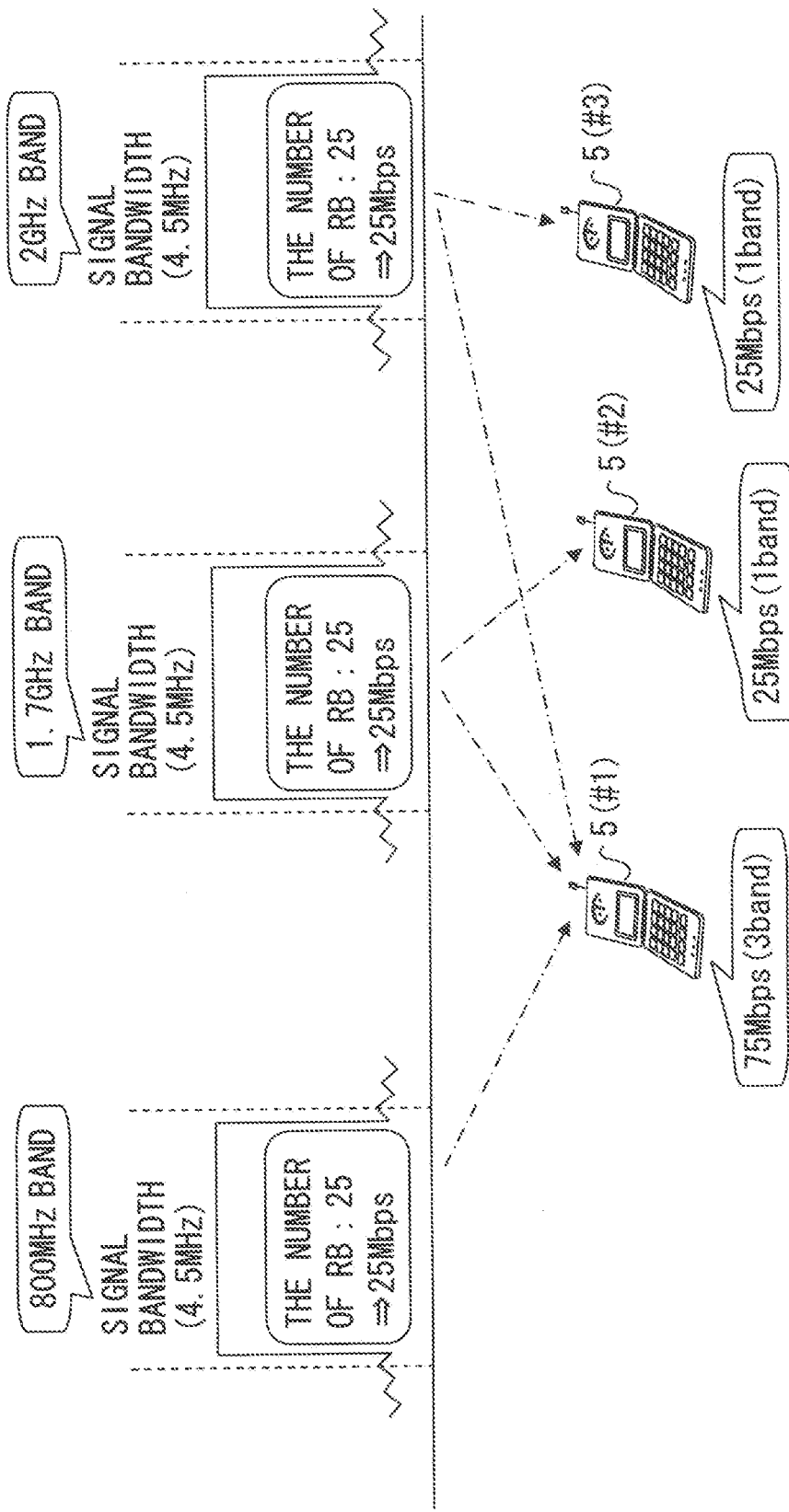
FIG. 3 is a conceptual diagram illustrating a transfer rate of a frequency aggregation scheme.

Hereinbelow, referring to FIGS. 2 and 3, description is given that a transfer rate of the same level as in the case of transmission using the continuous frequency in the same frequency band may be realized with the communication scheme using the frequency aggregation. FIG. 2 is a conceptual diagram illustrating a transfer rate of the communication scheme using the continuous frequency in the same frequency band. FIG. 3 is a conceptual diagram illustrating a transfer rate of the frequency aggregation scheme.

As the LTE communication scheme, an orthogonal frequency division multiplexing (OFDM) scheme is employed, for example. In the OFDM scheme, transmission data is divided into pieces of transmission data, the pieces of transmission data obtained through the division are mapped to a plurality of orthogonal carrier waves (subcarriers), respectively, and are transmitted in parallel on the frequency axis. Modulation and demodulation are performed in a unit called "resource block" (hereinafter, referred to also as "RB") or "chunk", which is obtained by aggregating one or more subcarriers.

As illustrated in FIGS. 2 and 3, a signal bandwidth (occupied bandwidth) used for an OFDM signal is generally designed so as to be smaller than an available frequency bandwidth in consideration of a leakage component and the like. In a case where a 15-MHz bandwidth is employed as in the example of FIG. 2, a 13.5-MHz OFDM signal is generated, while in a case where a 5-MHz bandwidth is employed as in the example of FIG. 3, a 4.5-MHz OFDM signal is generated. If it is assumed that each RB has a 180-kHz bandwidth, the number of RBs is 75 (=13.5 M/180 k) in the case of 13.5 MHz illustrated in FIG. 2, while in the case of 4.5 MHz illustrated in FIG. 3, the number of RBs is 25 (=4.5 M/180 k).

In this case, when the frequency aggregation is used for aggregating three bands each having a 5-MHz signal bandwidth (mobile terminal 5 (#1) illustrated in FIG. 3), the number of RBs is 75 (=25×3). If it is assumed that the maximum transfer rate for every 25 RBs is 25 Mbps, for example, in the case of FIG. 2 where the continuous frequency is used, a maximum transmission speed of 75 Mpbs is expected. Similarly, when the frequency aggregation is used for aggregating the three bands each having the 5-MHz bandwidth, a maximum transmission speed of 75 (=25×3) Mbps can be realized.

Accordingly, the transfer rate of the same level as in the case where the continuous frequency in the same frequency band is used may be realized with the frequency aggregation of the first embodiment. Processing amounts regarding inverse fast Fourier transform (hereinafter, referred to as "IFFT"), fast Fourier transform (hereinafter, referred to as "FFT"), and encoding/decoding, which are used for modulation processing and demodulation processing of OFDM, are the same between the two cases.

Figure 4:
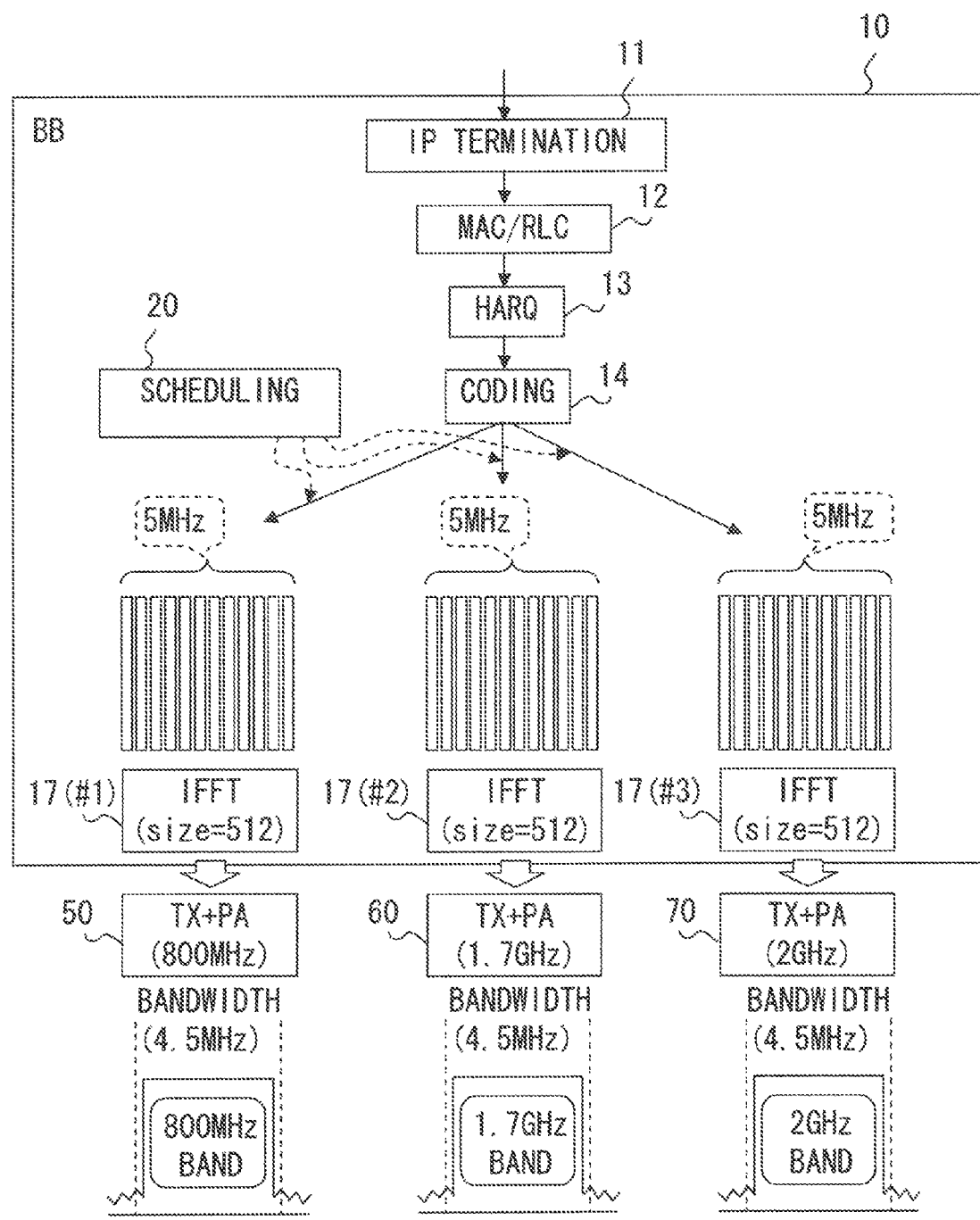
FIG. 4 is a diagram illustrating a conceptual example regarding downlink (DL) transmission processing performed by an LTE radio transmission device when frequency aggregation is executed.
Figure 5:
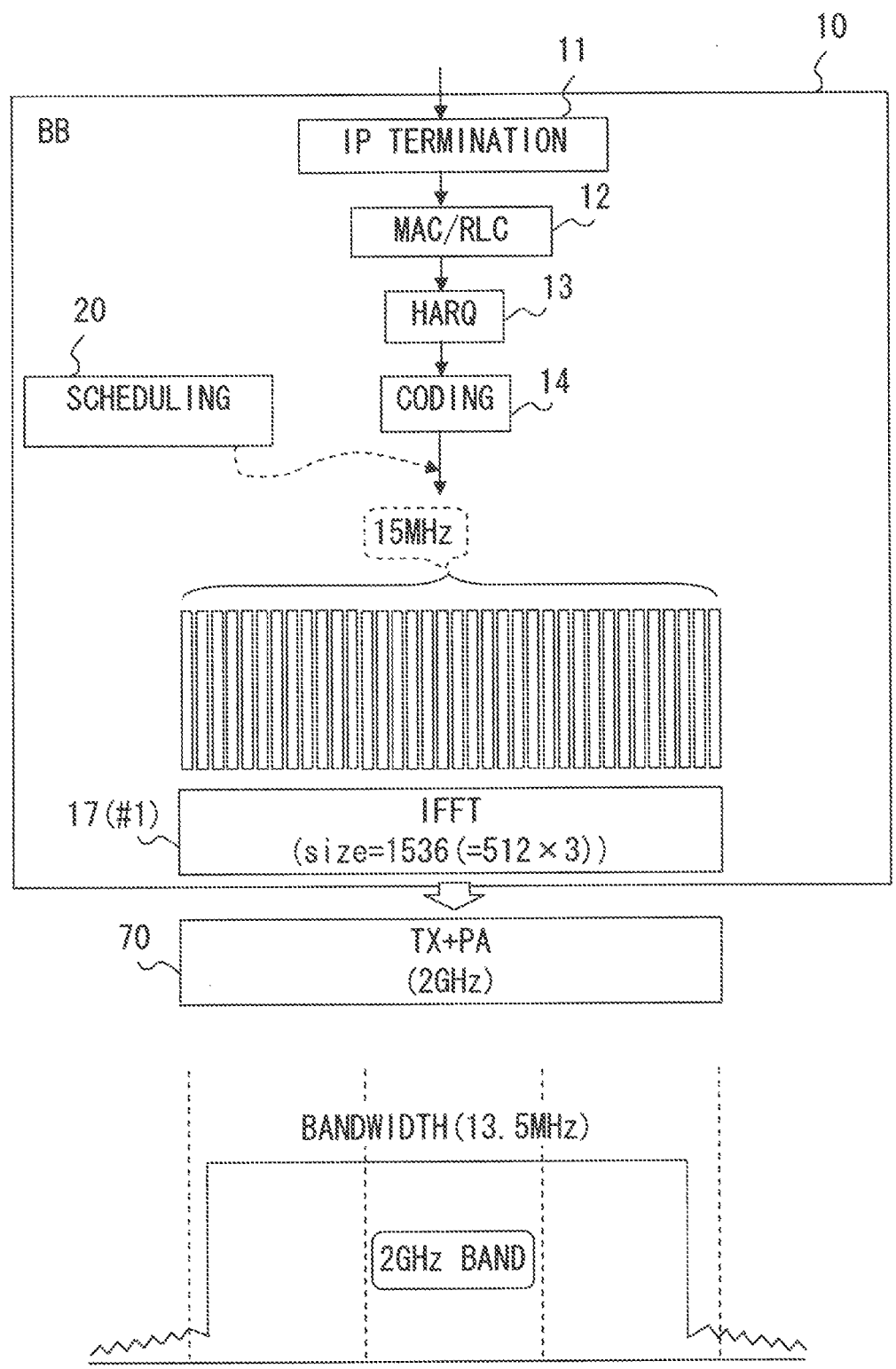
FIG. 5 is a diagram illustrating a conceptual example regarding downlink (DL) transmission processing performed by the LTE radio transmission device when the continuous frequency in the same frequency band is used.

FIG. 4 is a diagram illustrating a conceptual example of processing performed by an LTE transmission device when the frequency aggregation is executed. FIG. 5 is a diagram illustrating a conceptual example of processing performed by the LTE transmission device when the continuous frequency in the same frequency band is used. The transmission device (base station 1 or mobile terminal 5) that constitutes the mobile communication system of the first embodiment is different from the conventional transmission device in processing (including analog signal processing) subsequent to that of a coding unit (CODING) 14 of a baseband processing unit (BB) 10.

Specifically, when the frequency aggregation is applied as illustrated in FIG. 4, processing units 17 (#1), (#2), and (#3) that perform IFFT or FFT individually execute processing in a unit of 5 MHz, to thereby generate baseband OFDM signals, respectively. This processing is equivalent to multicarrier transmission processing for three sets of 5 MHz performed by the baseband processing unit (hereinafter, referred to as "BB unit") 10. The baseband OFDM signals are sent to radio transmission/reception processing units 50, 60, and 70 and up-converted into signals having 800-MHz, 1.7-GHz, and 2-GHz carrier frequencies, respectively, before transmission thereof.

Meanwhile, in a case where the continuous frequency in the same frequency band is used in the transmission device of the first embodiment as illustrated in FIG. 5, a processing unit 17 (#1) that performs IFFT or FFT performs processing collectively on the 15-MHz bandwidth, to thereby generate a baseband OFDM signal. With regard to the processing of IFFT or FFT, a field programmable gate array (FPGA), a digital signal processor (DSP), or the like may be used for processing an arbitrary band on the same card with setting change for a parameter. The generated baseband OFDM signal is sent to a radio transmission/reception processing unit 70 and up-converted into a signal having a predetermined carrier frequency (2 GHz in the example of FIG. 5). It should be noted that details of the functional units are described later.

[Device Configuration]

Hereinafter, description is given in detail of configurations of the base station 1 and the mobile terminal 5 that constitute the mobile communication system of the first embodiment. Hereinbelow, there is used such a configuration example that two different frequency bands of 1.7 GHz and 2 GHz are assumed as targets of the frequency aggregation, and radio signals are transmitted and received by using two branches (antennas) for the respective frequency bands.

<Base Station>

Figure 6:
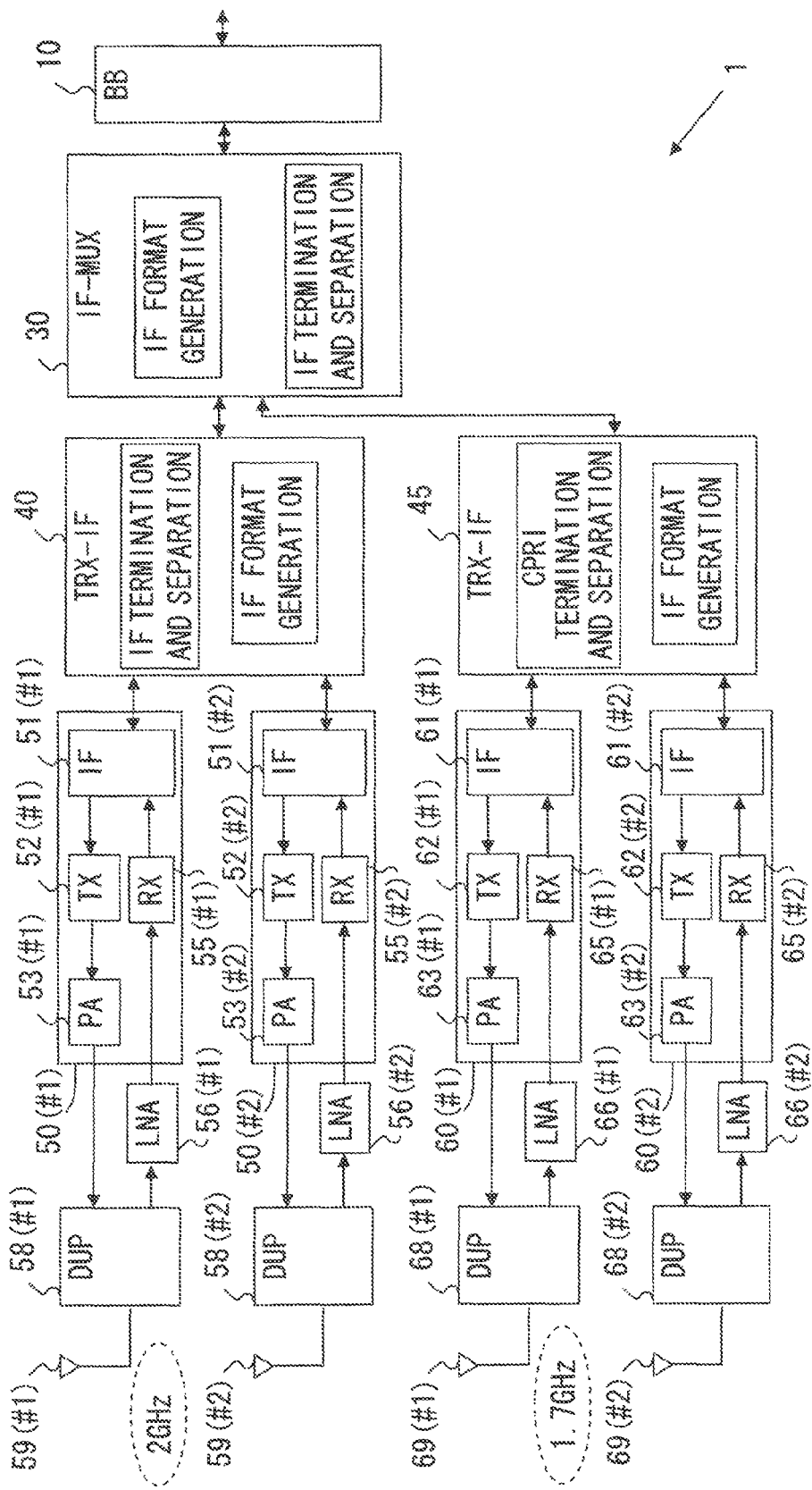
FIG. 6 is a block diagram illustrating an example of a configuration of a base station according to the first embodiment.

FIG. 6 is a block diagram illustrating an example of the configuration of the base station 1 according to the first embodiment. As illustrated in FIG. 6, the base station 1 includes a BB unit 10, an interface multiplexing unit (hereinafter, referred to as "IF-MUX unit") 30, radio transmission/reception processing interface units (hereinafter, referred to as "TRX-IF units") 40 and 45, radio transmission/reception processing units (hereinafter, referred to as "TRX units") 50 and 60, low noise amplifiers (hereinafter, referred to as "LNAs") 56 and 66, transmission/reception frequency duplexers (hereinafter, referred to as "DUPlexers (DUPs)") 58 and 68, and antennas 59 and 69. Those units of the base station 1 are each implemented as a software component, a hardware component, or a combination thereof (see [Others]).

The IF-MUX unit 30 converts an electric signal (baseband signal) sent from the BB unit 10 into a specified optical interface signal, and transmits the optical interface signal to the TRX-IF unit 40 or 45. Conversely, the IF-MUX unit 30 terminates an optical interface signal sent from the TRX-IF unit 40 or 45, converts the optical interface signal into an electric signal (baseband signal), and sends the electric signal to the BB unit 10. As the optical interface signal, a common public radio interface (CPRI) is employed, for example. It should be noted that this embodiment does not limit the type of the optical interface signal, and an electric signal may be used for relaying instead of the optical signal.

The IF-MUX unit 30 assigns each baseband OFDM signal sent from the BB unit 10 to the TRX-IF unit 40 or 45 that corresponds to its carrier frequency band. The IF-MUX unit 30 maps each signal to the optical interface signal so that the signal reaches the TRX-IF unit 40 or 45 serving as an assignment destination. Conversely, in a case where the IF-MUX unit 30 has received optical interface signals from the TRX-IF units 40 and 45, the IF-MUX unit 30 sends reception signals obtained from the optical interface signals to the BB unit 10 so that their carrier frequency bands can be discriminated.

The TRX-IF unit 40 terminates the optical interface signal sent from the IF-MUX unit 30, converts the optical signal into electric signals, and sends the electric signals to the TRX units 50 (#1) and (#2), respectively. At this time, the TRX-IF unit 40 extracts only a signal mapped to the optical interface signal and addressed to the TRX-IF unit 40 itself, and converts the extracted signal into the electric signals. Conversely, when the TRX-IF unit 40 has received electric signals from the TRX units 50 (#1) and (#2), the TRX-IF unit 40 converts the electric signals into a specified optical interface signal. The TRX-IF unit 40 sends the optical interface signal to the IF-MUX unit 30.

The TRX-IF unit 45 performs the same processing as that of the TRX-IF unit 40 with respect to the TRX units 60 (#1) and (#2). It should be noted that a technique of generating a signal format for the optical interface signal, which is used by the IF-MUX unit 30 and the TRX-IF units 40 and 45, is described later.

As described above, the base station 1 of the first embodiment uses the 1.7-GHz band and the 2-GHz band as the carrier frequencies, and includes two branches for each of the carrier frequencies. Thus, the base station 1 includes two groups (#1 and #2) of the TRX units 50, the LNAs 56, the DUPs 58, and the antennas 59 that correspond to the 2-GHz band carrier frequency, and two groups (#1 and #2) of the TRX units 60, the LNAs 66, the DUPs 68, and the antennas 69 that correspond to the 1.7-GHz band carrier frequency. The series of the functional unit groups are hereinafter referred to also as "radio processing functional groups".

Hereinbelow, description is given of one of the radio processing functional groups that correspond to one carrier frequency. It should be noted that this embodiment mode is not limited to such a configuration, and hence the number of radio processing functional groups to be provided may correspond to the number of carrier frequency bands to be subjected to the frequency aggregation. Further, the carrier frequency bands to be subjected to the frequency aggregation refer to discontinuous bands, which include bands in different frequency bands and discontinuous bands in the same frequency band.

The TRX unit 50 includes an interface (IF) unit 51, a radio transmission unit (hereinafter, referred to as "TX unit") 52, a power amplifier (hereinafter, referred to as "PA unit") 53, and a radio reception unit (hereinafter, referred to as "RX unit") 55. The TRX unit 50 uses those units to convert a digital baseband signal sent from the TRX-IF unit 40 into an analog signal, up-convert the analog signal into a signal having a corresponding carrier frequency (2-GHz band), amplify the resultant signal, and send the amplified signal to the DUP 58. Conversely, the TRX unit 50 receives an amplified reception signal from the LNA 56, converts the reception signal into a digital baseband signal, and sends the digital baseband signal to the TRX-IF unit 40.

The DUP 58 separates the transmission signal and the reception signal from each other so as to share the antenna 59 for transmission and reception. The DUP 58 radiates the transmission signal through the antenna 59, and sends the reception signal to the LNA 56.

The TRX unit 60, the LNA 66, the DUP 68, and the antenna 69 have the same functions as the units described above, respectively, except that the frequency band to be processed is 1.7-GHz band.

Figure 7:
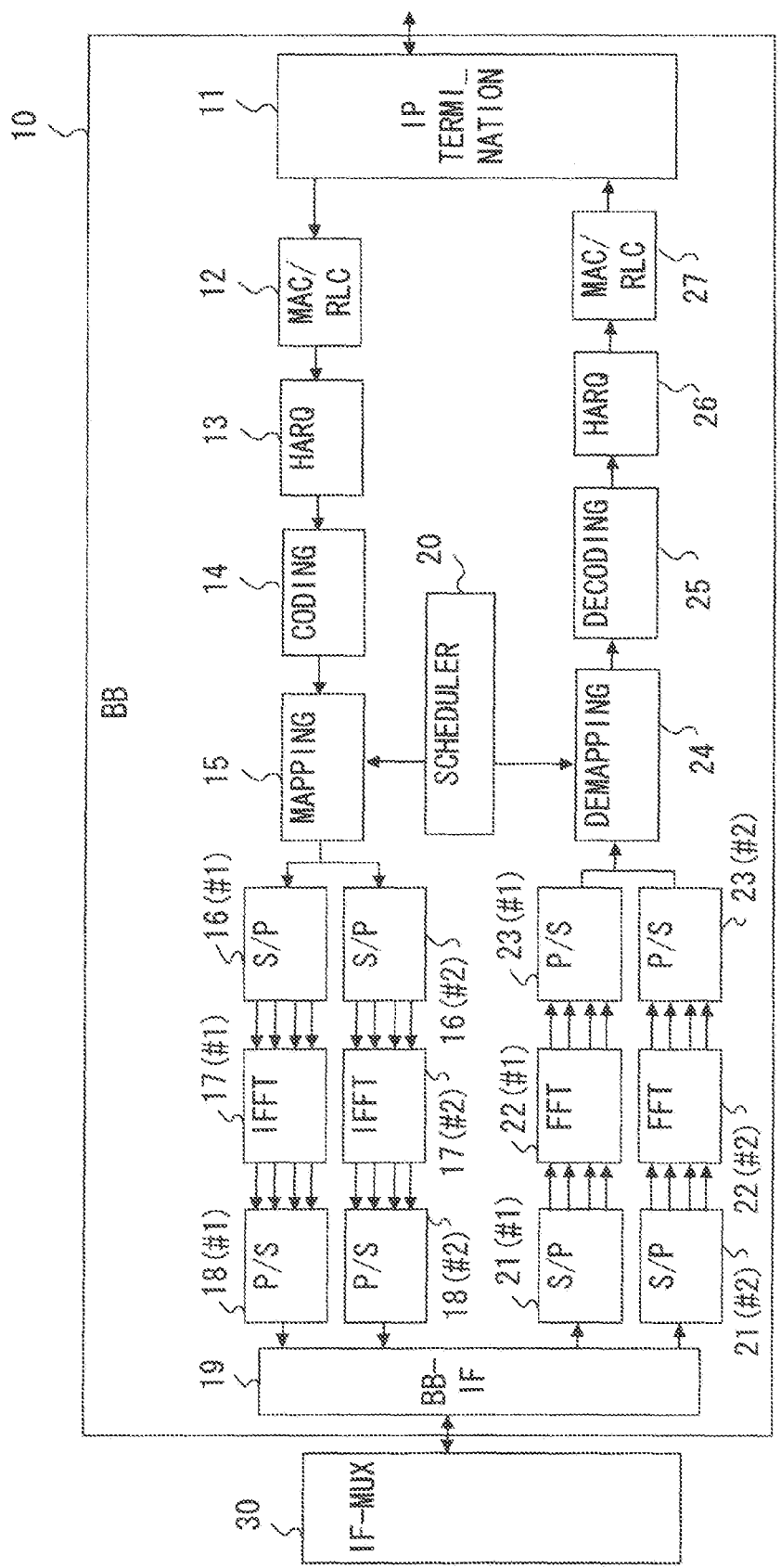
FIG. 7 is a block diagram illustrating a configuration of a baseband processing (BB) unit of a base station 1 according to the first embodiment.

FIG. 7 is a block diagram illustrating a configuration of the baseband processing (BB) unit 10 of the base station 1 according to the first embodiment. As illustrated in FIG. 7, the BB unit 10 includes an IP termination unit 11, media access control (MAC)/radio link control (RLC) units 12 and 27, hybrid automatic repeat request (HARQ) units 13 and 26, a coding unit 14, a mapping unit 15, serial-parallel (S/P) conversion units 16 and 21, IFFT units 17, parallel-serial (P/S) conversion units 18 and 23, a scheduler 20, FFT units 22, a demapping unit 24, and a baseband interface unit (hereinafter, referred to as "BB-IF unit") 19.

The IP termination unit 11 performs IP communication in the C-plane and the U-plane with another control device (not shown) or the like, and terminates the IP communication. The MAC/RLC unit 12 performs media access control and radio link control such as radio resource allocation control. The HARQ units 13 and 26 each perform error correction while enhancing transmission efficiency. The coding unit 14 encodes data sent from the HARQ unit 13 by using an encoding scheme of an encoding rate corresponding to the data, and sends the encoded data to the mapping unit 15. A decoding unit 25 decodes reception data sent from the demapping unit 24, and sends the decoded data to the HARQ unit 26.

The mapping unit 15 maps the data sent from the coding unit 14 to each subcarrier in response to an instruction from the scheduler 20. Specifically, the mapping unit 15 arranges each input data onto a subcarrier through modulation using a modulation scheme corresponding to the RB to which the arrangement target subcarrier belongs (such as quadrature phase shift keying (QPSK), 16 quadrature amplitude modulation (QAM), and 64QAM). The mapping unit 15 sends the modulated signal to the S/P conversion unit 16 (#1) or (#2) in response to an instruction from the scheduler 20.

The S/P conversion units 16, the IFFT units 17, the P/S conversion units 18 are units that perform a series of signal processing, and (#1) and (#2) have the same function. Hereinafter, as a representative example, description is given of functions of the S/P conversion unit 16 (#1), the IFFT unit 17 (#1), and the P/S conversion unit 18 (#1). It should be noted that the number of groups of those units to be provided may correspond to the number of carrier frequency bands to be subjected to the frequency aggregation. In this embodiment, two carrier frequency bands, that is, the 1.7-GHz band and the 2-GHz band, are to be subjected to the frequency aggregation, and hence two groups of those units, that is, (#1) and (#2), are provided.

The S/P conversion unit 16 (#1) converts the modulated signal sent from the mapping unit 15 to a predetermined number of parallel signals based on a bandwidth to be processed by the IFFT unit 17 (#1). The number of the parallel signals is determined based on the frequency bandwidth to be processed by the IFFT unit 17 (#1). The S/P conversion unit 16 (#1) sends the parallel signals obtained through the conversion to the IFFT unit 17 (#1) at the same symbol time.

The IFFT unit 17 (#1) has an IFFT size set therein in advance based on the bandwidth to be processed. For example, in a case where a 5-MHz bandwidth is to be processed as in the example of FIG. 4, an IFFT size of 512 is set in the IFFT unit 17 (#1). Other than the above, in a case where a 10-MHz bandwidth is to be processed, for example, an IFFT size of 1024 is set therein.

The IFFT unit 17 (#1) performs IFFT processing on the parallel signals on an OFDM symbol basis, and sends generated parallel time domain signals to the P/S conversion unit 18 (#1).

The P/S conversion unit 18 (#1) converts the parallel signals sent from the IFFT unit 17 (#1) into a serial signal, to thereby generate a baseband OFDM signal.

In this manner, two lines of the baseband OFDM signals, which are generated by the group (#1) and the group (#2) of the S/P conversion units 16, the IFFT units 17, and the P/S conversion units 18, are sent to the BB-IF unit 19, respectively.

The S/P conversion units 21, the FFT units 22, and the P/S conversion units 23, which are used for performing reception signal processing, are also units that perform a series of signal processing, and (#1) and (#2) have the same function. Hereinbelow, as a representative example, description is given of functions of the S/P conversion unit 21 (#1), the FFT unit 22 (#1), and the P/S conversion unit 23 (#1).

The S/P conversion unit 21 (#1) converts a digital signal sent from the BB-IF unit 19 into a predetermined number of parallel signals having a symbol length. The number of the parallel signals is determined based on the frequency bandwidth to be processed by the FFT unit 22 (#1). The S/P conversion unit 21 (#1) sends the parallel signals obtained through the conversion to the FFT unit 22 (#1).

The FFT unit 22 (#1) performs FFT processing on the input parallel signals, and outputs a predetermined number of frequency domain signals corresponding to subcarrier components, respectively. The P/S conversion unit 23 (#1) converts the frequency domain signals into a serial data sequence, and sends the serial data sequence to the demapping unit 24.

The demapping unit 24 demodulates the serial data sequence sent from each of the P/S conversion units 23 (#1) and (#2) by using the modulation scheme applied to the symbol of each subcarrier. Binary data obtained through the demodulation is sent to the decoding unit 25.

The BB-IF unit 19 has an interface function between the BB unit 10 and the IF-MUX unit 30. The BB-IF unit 19 sends the two lines of the baseband OFDM signals, which are sent from the P/S conversion units 18 (#1) and (#2), to the IF-MUX unit 30 so that both the signals can be discriminated from each other. Conversely, the BB-IF unit 19 assigns the digital signal sent from the IF-MUX unit 30 and received at each carrier frequency band to any one of the S/P conversion units 21 (#1) and (#2) based on its carrier frequency band.

As described above, the BB unit 10 of the first embodiment generates the two lines of the baseband OFDM signals, and sends the baseband OFDM signals to the IF-MUX unit 30. The baseband OFDM signals may correspond to the 5-MHz and 10-MHz bandwidths, or one of the baseband OFDM signals may correspond to the 5-MHz bandwidth while the other may correspond to the 10-MHz bandwidth. The frequency bandwidths to be processed are determined in advance based on an allocation status of the frequency band, an installation status of the base station, and the like.

Next, description is given of the technique of generating a signal format for the optical interface signal, which is used by the IF-MUX unit 30 and the TRX-IF units 40 and 45, by taking the CPRI as an example.

For example, the CPRI may have the following bit format. Specifically, the CPRI has a 1/3.84 MHz-based bit format. The CPRI is formed so that when a 5-MHz bandwidth is employed for one carrier, in downlink, user plane IQ data having I (in-phase component) and Q (quadrature component) of each 15-bit each may be obtained for eight branch carriers (two branches×four carrier waves), and in uplink, user plane IQ data (double oversampling) having I and Q of each 7-bit each may be obtained for eight branch carriers (two branches×four carrier waves).

In some cases, as the transmission speed of a CPRI unit in the W-CDMA system, 1.2288 Gbps may be applied. In this embodiment, there is taken as an example a case where doubled 2.4576 Gbps is employed as the LTE transmission scheme. Described below is an example of the CPRI bit format in this case.

Carrier branch-based transmission speeds in cases where the respective frequency bandwidths are employed may be calculated as follows. It should be noted that the example is described with the numbers of bits of I and Q each set to 15.

$CPRI$ transmission speed = transmission speed after $IFFT$ or $FFT$

= sampling rate × number of bits × 2 $(I, Q)$ (when a 20-MHz bandwidth is employed)

= 30.72 $Mbps$ × 15 bits × 2 = 921.6 $Mbps$ (when a 15-MHz bandwidth is employed)

= 23.04 $Mbps$ × 15 bits × 2 = 691.2 $Mbps$ (when a 10-MHz bandwidth is employed)

= 15.36 $Mbps$ × 15 bits × 2 = 460.8 $Mbps$ (when a 5-MHz bandwidth is employed)

= 7.68 $Mbps$ × 15 bits × 2 = 230.4 $Mbps$

When the currently-standardized CPRI format is followed and each transmission speed is allocated to the 1/3.84 MHz-based bit format, the number of necessary carrier branch-based bits corresponding to each bandwidth is calculated as follows.

(when the 20-MHz bandwidth is employed) 240 bits/3.84 cps (when the 15-MHz bandwidth is employed) 180 bits/3.84 cps (when the 10-MHz bandwidth is employed) 120 bits/3.84 cps (when the 5-MHz bandwidth is employed) 60 bits/3.84 cps Accordingly, 480 bits are necessary in the cases where the four carriers each having the carrier frequency bandwidth of 5-MHz are employed, two carriers each having the carrier frequency bandwidth of 10-MHz are employed, and where one carrier having the carrier frequency bandwidth of 20-MHz is employed in the configuration of this embodiment (two lines of branches (antennas) for each carrier frequency band).

Figure 8:
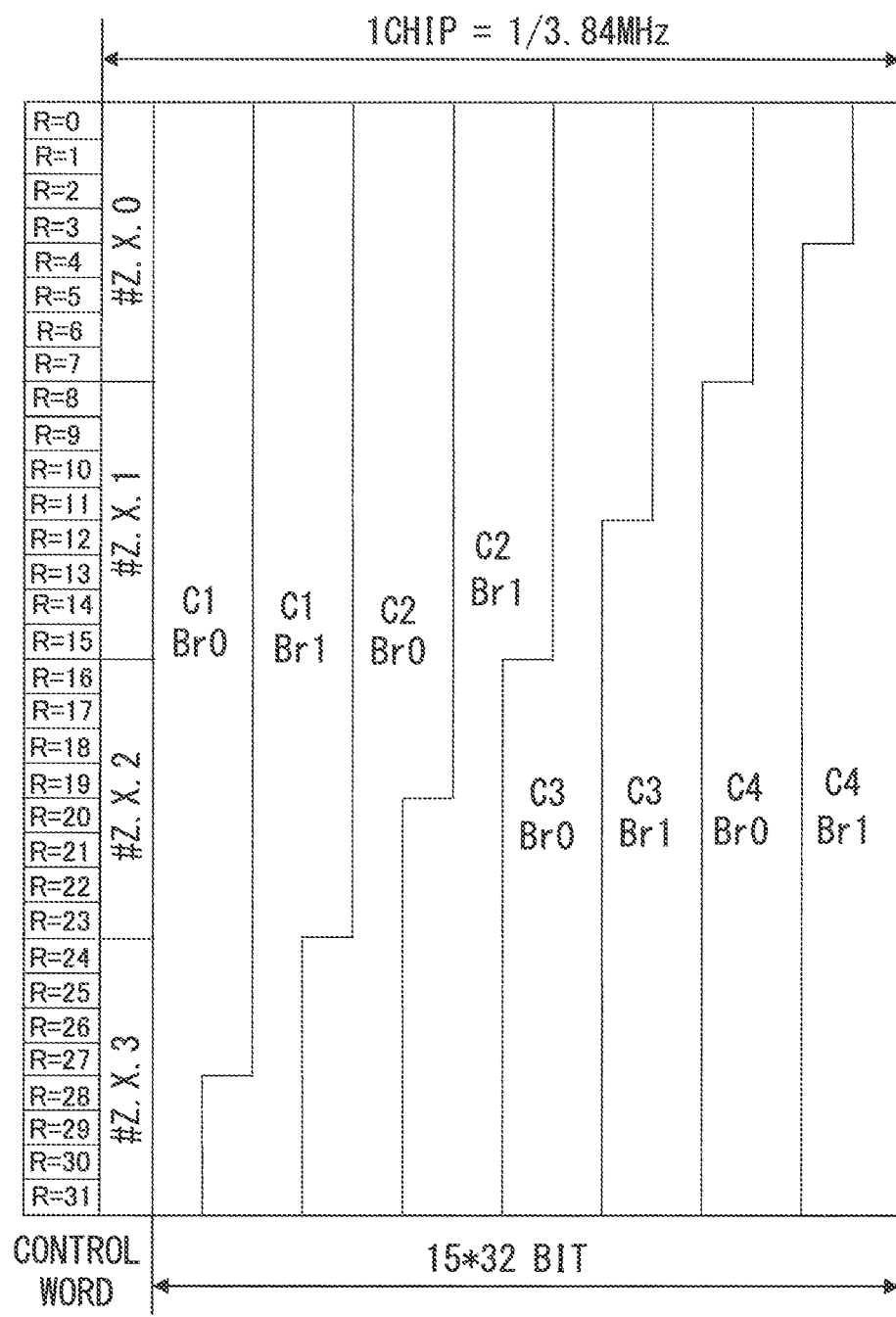
FIG. 8 illustrates an example of a CPRI format in downlink in a case where four carriers each with the carrier frequency bandwidth of 5-MHz are employed in the first embodiment.
Figure 9:
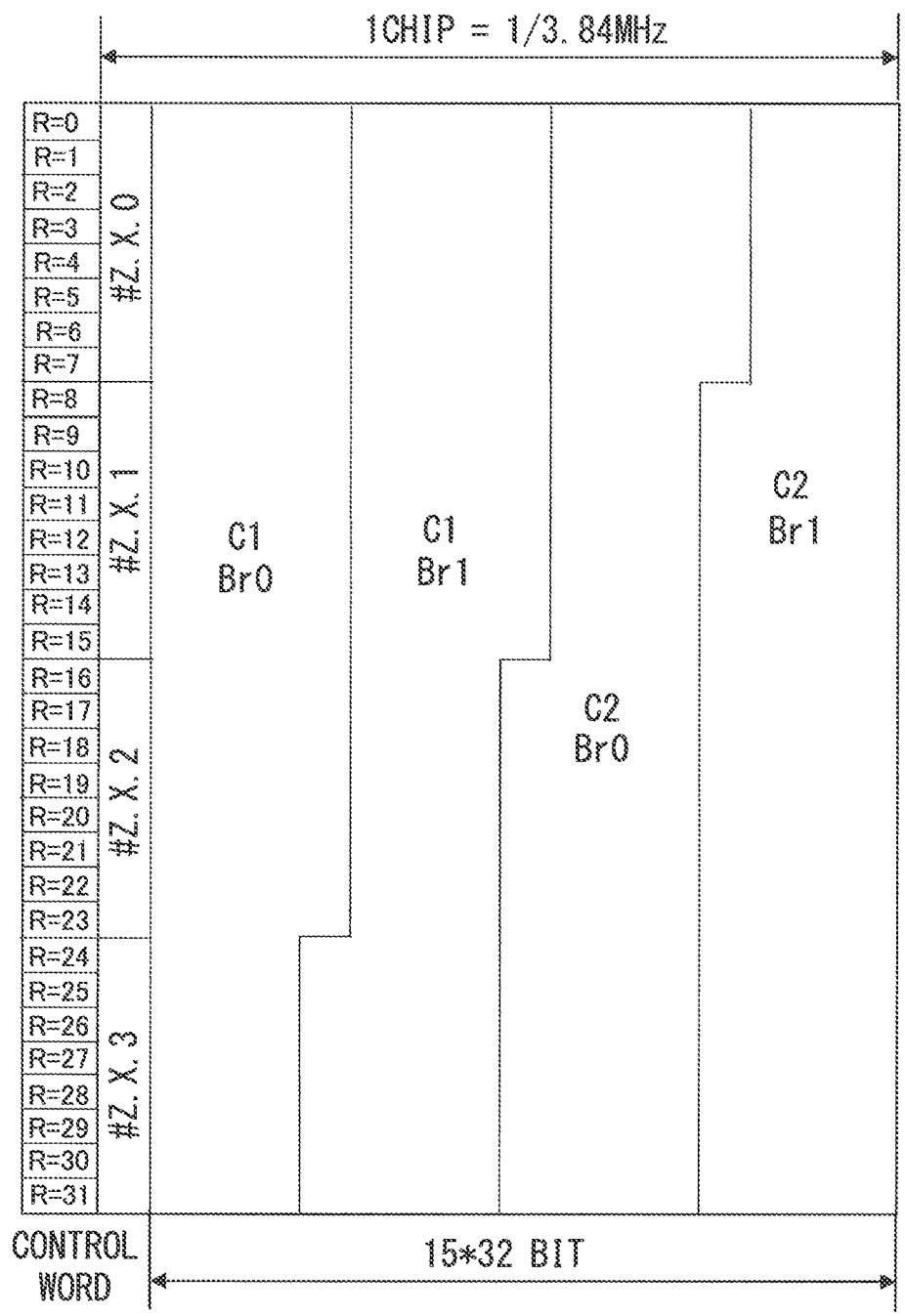
FIG. 9 illustrates an example of the CPRI format in downlink in a case where two carriers each with the carrier frequency bandwidth of 10-MHz are employed in the first embodiment.

Thus, the CPRI bit format of the first embodiment is defined as a 15×32 bit format as illustrated in FIGS. 8 and 9. FIG. 8 illustrates an example of a CPRI format in downlink in the case where four carriers each with the carrier frequency bandwidth of 5-MHz are employed in the first embodiment. FIG. 9 illustrates an example of the CPRI format in downlink in the case where two carriers each with the carrier frequency bandwidth of 10-MHz are employed in the first embodiment.

In the example of FIG. 8, C1 (carrier 1) and C2 (carrier 2) may each be allocated as the 2-GHz band while C3 and C4 may each be allocated as the 1.7-GHz band. In the example of FIG. 9, C1 may be allocated as the 2-GHz band while C2 may be allocated as the 1.7-GHz band. In the example of FIG. 9, other than the above, C1 may be used as the 10-MHz bandwidth in the 2-GHz band while C2 may be used as the 5-MHz bandwidth in the 1.7-GHz band.

It should be noted that, though the uplink CPRI format is not illustrated herein, a format obtained through double oversampling may be used for allocation similarly to the case of the uplink in the W-CDMA system.

The IF-MUX unit 30 and the TRX-IF units 40 and 45 of the first embodiment map a reception signal or a transmission signal to the CPRI bit format as illustrated in each of FIGS. 8 and 9. For example, in the example of FIG. 8, the IF-MUX unit 30 maps the baseband OFDM signal generated via the IFFT unit 17 (#1) to Br (branch) 0 of C1 and Br1 of C, and maps the baseband OFDM signal generated via the IFFT unit 17 (#2) to Br0 of C2 and Br1 of C2.

<Mobile Terminal>

Figure 10:
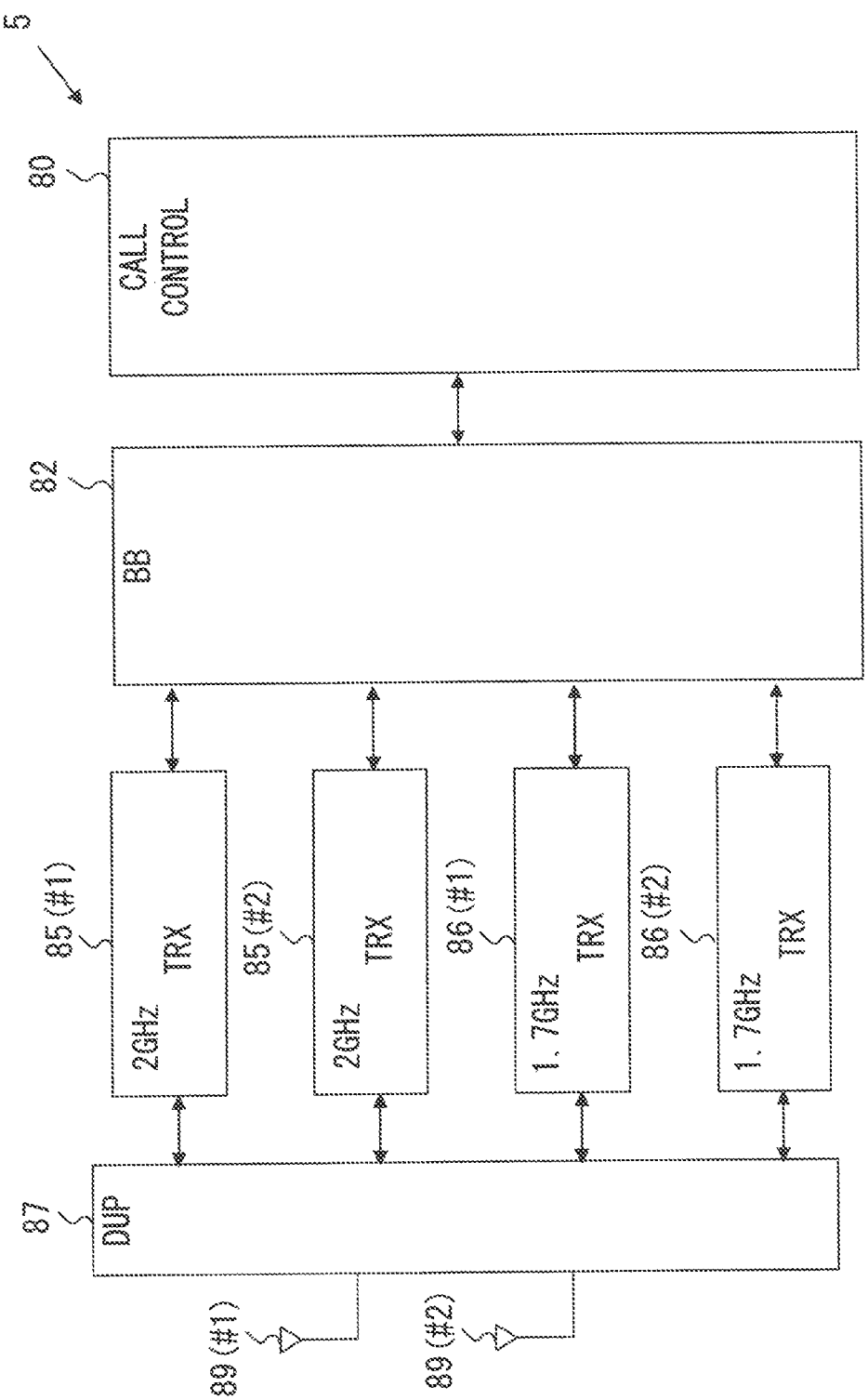
FIG. 10 is a block diagram illustrating an example of a configuration of a mobile terminal according to the first embodiment.

FIG. 10 is a block diagram illustrating an example of the configuration of the mobile terminal 5 according to the first embodiment. As illustrated in FIG. 10, the mobile terminal 5 includes a call control unit 80, a BB unit 82, TRX units 85 and 86, a DUP 87, and antennas 89. Those functional units of the mobile terminal 5 are each implemented as a software component, a hardware component, or a combination thereof (see [Others]).

As described above, the mobile terminal 5 of the first embodiment uses the 1.7-GHz band and the 2-GHz band as the carrier frequencies. The mobile terminal 5 includes two branches (antennas) for the carrier frequencies (89 (#1) and (#2)), respectively, and further includes two TRX units for each of the carrier frequencies. Specifically, the mobile terminal 5 includes two TRX units 85 (85 (#1) and (#2)) that correspond to the 2-GHz band carrier frequency, and two TRX units 86 (86 (#1) and (#2)) that correspond to the 1.7-GHz band carrier frequency.

The TRX units 85 and 86 each have the same units (TX unit, RX unit, PA unit, and the like) (not shown) as the TRX units 50 and 60 of the base station 1 described above, respectively. Each of the TRX units 85 and 86 converts a digital baseband signal sent from the BB unit 82 into an analog signal, up-converts the analog signal into a signal having a corresponding carrier frequency (2-GHz band or 1.7-GHz band), amplifies the resultant signal, and sends the amplified signal to the DUP 87. Conversely, each of the TRX units 85 and 86 receives a reception signal from the DUP 87, amplifies the reception signal, converts the amplified signal into a digital baseband signal, and sends the digital baseband signal to the BB unit 82. The TRX units 85 and 86 each have the same functions except that the TRX units 85 and 86 process different frequency bands.

The DUP 87 separates the transmission signal and the reception signal from each other so as to share the antenna 89 for transmission and reception. The DUP 87 radiates the transmission signal through the antenna 89, and sends the reception signal to each of the TRX units 85 and 86. When a 2-GHz signal and a 1.7-GHz signal that are transmitted from the base station 1 are received through the antenna 89 (#1), the DUP 87 sends the high-frequency radio signals received through the antenna 89 (#1) to the TRX unit 85 (#1) responsible for signal processing for the 2-GHz band, and to the TRX unit 86 (#1) responsible for signal processing for the 1.7-GHz band, respectively. Conversely, at the time of transmission, the DUP 87 sends a 2-GHz band radio signal sent from the TRX unit 85 (#1) to the antenna 89 (#1), and a 2-GHz band radio signal sent from the TRX unit 85 (#2) to the antenna 89 (#2). The DUP 87 further sends a 1.7-GHz band radio signal sent from the TRX unit 86 (#1) to the antenna 89 (#1), and a 1.7-GHz band radio signal sent from the TRX unit 86 (#2) to the antenna 89 (#2).

Figure 11:
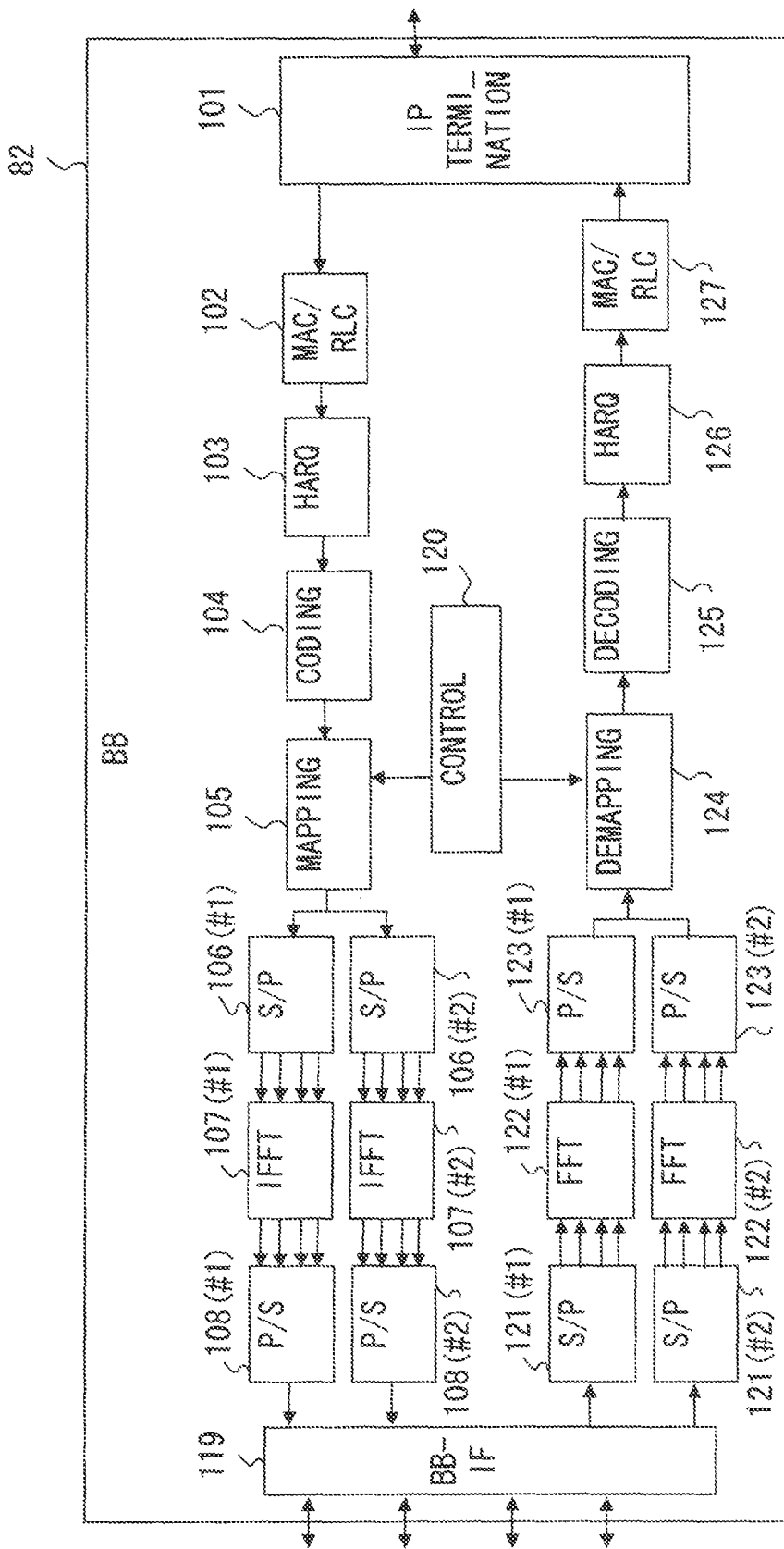
FIG. 11 is a block diagram illustrating a configuration of a baseband processing unit of the mobile terminal according to the first embodiment.

FIG. 11 is a block diagram illustrating a configuration of the BB unit 82 of the mobile terminal 5 according to the first embodiment. As illustrated in FIG. 11, the BB unit 82 includes an IP termination unit 101, MAC/RLC units 102 and 127, HARQ units 103 and 126, a coding unit 114, a mapping unit 115, serial-parallel (S/P) conversion units 116 and 121, IFFT units 117, parallel-serial (P/S) conversion units 118 and 123, a control unit 120, FFT units 122, a demapping unit 124, and a baseband interface unit (hereinafter, referred to as "BB-IF unit") 119. Those units are the same as those of the BB unit 10 of the base station 1 described above except that the scheduler 20 is replaced with the control unit 120. Hereinafter, description of the same units as those of the BB unit 10 of the base station 1 is therefore omitted and the units different from those of the base station 1 are only described.

The IFFT unit 107 and the FFT unit 122 hold the IFFT size and the FFT size so that the IFFT size and the FFT size may be adjusted based on the bandwidth to be used for wireless communication to the base station 1, respectively. The S/P conversion units 106 and 121 generate a predetermined number of parallel signals based on the IFFT size and the FFT size that are set in the IFFT unit 107 and the FFT unit 122, respectively.

The BB-IF unit 119 has an interface function in between the BB unit 82 and the TRX units 85 and 86. The BB-IF unit 119 assigns two lines of baseband OFDM signals, which are sent from the P/S conversion units 108 (#1) and (#2), to the TRX units 85 and 86 based on their carrier frequency bands, before transmission thereof. Conversely, the BB-IF unit 119 assigns the digital signals sent from the TRX units 85 or 86 and received at each carrier frequency band to any one of the S/P conversion units 121 (#1) and (#2) based on their carrier frequency band.

The control unit 120 determines the bandwidth to be used for wireless communication to the base station 1, based on resource allocation information contained in a control channel transmitted from the base station 1. The control unit 120 sets the IFFT size and the FFT size in the IFFT unit 107 and the FFT unit 122 based on the determined bandwidth, respectively. For example, in a case where a 5-MHz bandwidth is employed, the control unit 120 sets an IFFT size of 512 in the IFFT unit 107, while in a case where a 10-MHz bandwidth is employed, the control unit 120 sets an IFFT size of 1024 therein.

The call control unit 80 controls a user call to be transmitted from the mobile terminal 5, a user call transmitted from the base station 1, and the like. This embodiment mode does not limit the process of the call control unit 80.

Operation Example

Figure 12:
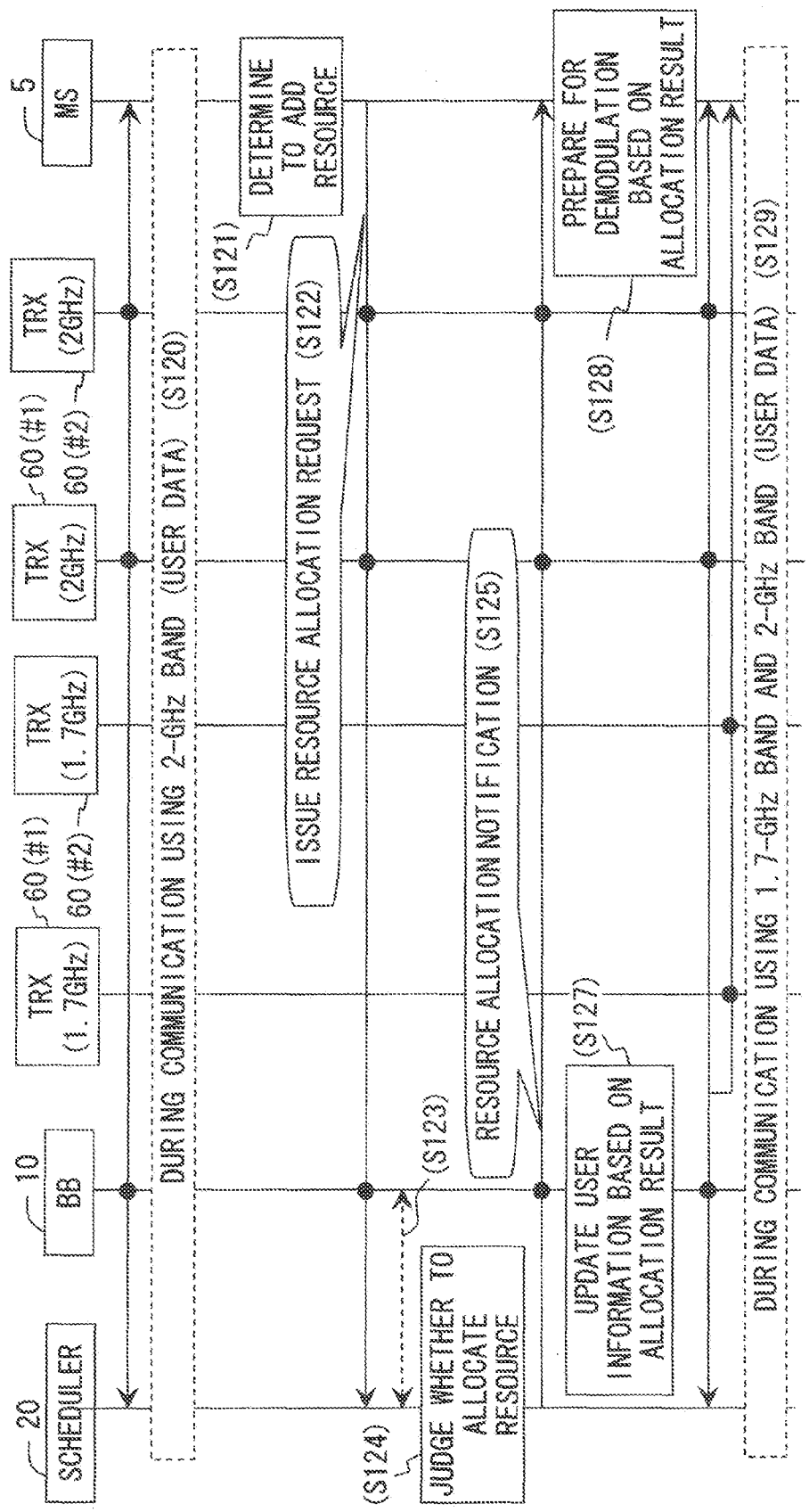
FIG. 12 is a sequence diagram illustrating an operation example of the mobile communication system according to the first embodiment.

Hereinbelow, referring to FIG. 12, description is given of an operation example of the mobile communication system according to the first embodiment. FIG. 12 is a sequence diagram illustrating the operation example of the mobile communication system according to the first embodiment.

First, it is assumed that the base station 1 and the mobile terminal (MS) 5 that constitute the mobile communication system of the first embodiment communicate to each other using a 5-MHz bandwidth in the 2-GHz band as the carrier frequency (S120).

Figure 13:
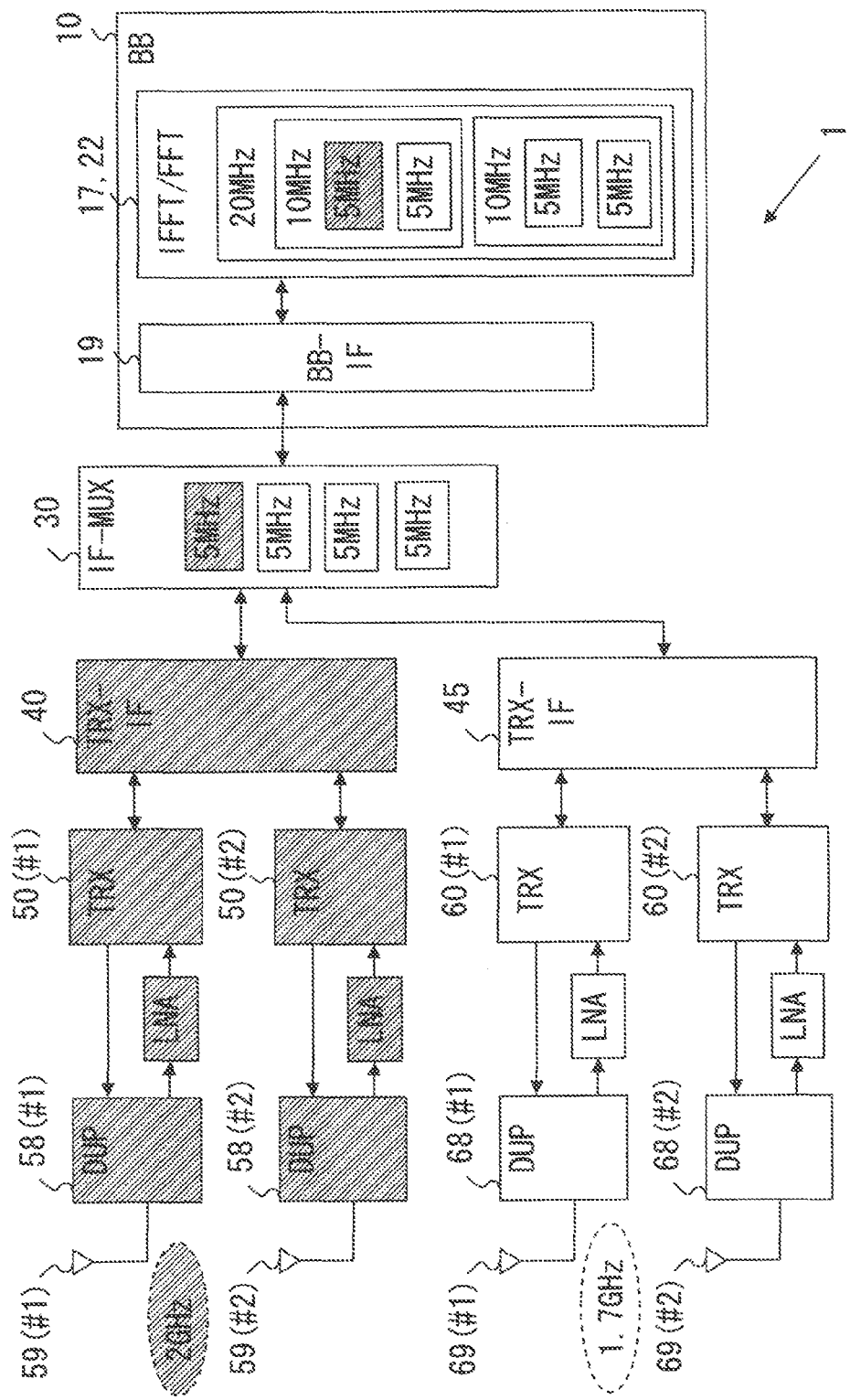
FIG. 13 is a conceptual diagram illustrating an operation image of the base station in a case where a 5-MHz bandwidth in a 2-GHz band is used.

At this time, the units of the base station 1 operate as illustrated in FIG. 13. FIG. 13 is a conceptual diagram illustrating an operation image of the base station 1 in a case where the 5-MHz bandwidth in the 2-GHz band is used. In this case, the hatched units of FIG. 13 function.

Specifically, the IFFT unit 17 (#1) of the BB unit 10 of the base station 1 operates, and the IFFT size of 512 is set therein in advance. The baseband OFDM signal generated in the BB unit 10 is sent from the IF-MUX unit 30 to the TRX-IF unit 40 by using the CPRI, and then sent to the TRX units 50 (#1) and (#2) that generate 2-GHz band radio signals. The TRX units 50 (#1) and (#2) up-convert the baseband OFDM signals into signals having the 2-GHz band carrier frequency, and radiate the resultant signals through the antennas 59 (#1) and (#2), respectively.

When the mobile terminal 5 has received the 2-GHz band radio signals through the antennas 89 (#1) and (#2), the reception signals are sent to the TRX units 85 (#1) and (#2), respectively. The TRX units 85 (#1) and (#2) down-convert the reception signals, for example, to thereby convert the reception signals into baseband signals, and send the baseband signals to the BB unit 82, respectively. In the BB unit 82, the FFT unit 122 (#1) operates, and the FFT size of 512 is set therein. The FFT unit 122 (#1) performs FFT processing on the baseband signals, the demapping unit 124 demodulates the signals obtained through the FFT processing, and a decoding unit 125 decodes the signals, to thereby obtain user data.

Next, it is assumed that, under such a situation, a high-speed transmission request has been issued to the mobile terminal 5. At this time, the mobile terminal 5 determines to add a radio resource (S121).

When the mobile terminal 5 determines to add the radio resource, the mobile terminal 5 uses a control channel or the like to issue a resource allocation request to the base station 1 (S122). The resource allocation request may contain a holding amount of the HARQ buffers 103 or 126 of the BB unit 82 of the mobile terminal 5, or a resource request bit indicating resource increase, resource decrease, or resource maintenance. Further, the resource allocation request may be transmitted from the mobile terminal 5 to the base station 1 periodically. A radio signal indicating the resource allocation request is transmitted using the 2-GHz band with which communication is being performed at this time.

In the base station 1, signals containing the resource allocation request are received through the antennas 59 (#1) and (#2), and sent to the TRX units 50 (#1) and (#2), respectively. The reception signals are converted into digital signals by the TRX units 50, and sent to the BB unit 10 via the TRX-IF unit 40 and the IF-MUX unit 30. In the BB unit 10, the FFT unit 22 (#1) operates to perform FFT processing on the digital signals, the demapping unit 24 demodulates the signals obtained through the FFT processing, and the decoding unit 25 decodes the signals.

When the resource allocation request obtained through the decoding has been received, the scheduler 20 determines executability of resource allocation, allocable band and bandwidth, and the like (S124). The scheduler 20 checks whether or not there is any idle resource among the bands available for the system. In this example, the scheduler 20 judges that there is no idle resource in the 2-GHz band but there is an idle resource in the 1.7-GHz band. In other words, the scheduler 20 determines to use the frequency aggregation (10-MHz bandwidth in total, including the 5-MHz bandwidth in the 2-GHz band and the 5-MHz bandwidth in the 1.7-GHz band) to establish connection to the mobile terminal 5. At this time, the scheduler 20 may exchange information with the BB unit 10 for the purpose of such judgment regarding the resource allocation (S123).

When the scheduler 20 has judged that the resource allocation is possible, the scheduler 20 gives an instruction to send, to the mobile terminal 5, a resource allocation notification containing information on the resource allocation (S125). The resource allocation notification is transmitted by using a predetermined control channel or the like. Further, the resource allocation notification contains information on, for example, a location of the resource block, a transport block size, a modulation scheme, an allocation timing, a frequency band to be allocated, and a bandwidth to be allocated. It should be noted that a fixed bandwidth (for example, 5 MHz) of the system may be determined in advance as the bandwidth to be allocated, and hence the bandwidth to be allocated may be excluded from the resource allocation notification.

Signals containing the resource allocation notification are up-converted into signals having the 2-GHz band carrier frequency by the TRX units 60 (#1) and (#2) before transmission thereof. After that, the scheduler 20 updates resource information on the user based on the resource allocation result (S127).

Meanwhile, when the mobile terminal 5 has extracted the resource allocation notification from the received control channel, the mobile terminal 5 prepares for demodulation by adjusting the S/P conversion units 106 and 121, the IFFT units 107, the FFT units 122, the demapping unit 124, the mapping unit 105, and the like based on the allocation result (S128).

Subsequently, the mobile terminal 5 and the base station 1 use the 10-MHz bandwidth in total, including the 5-MHz bandwidth in the 1.7-GHz band and the 5-MHz bandwidth in the 2-GHz band, which has been obtained by executing the frequency aggregation, to thereby transmit and receive user data (S129).

Figure 14:
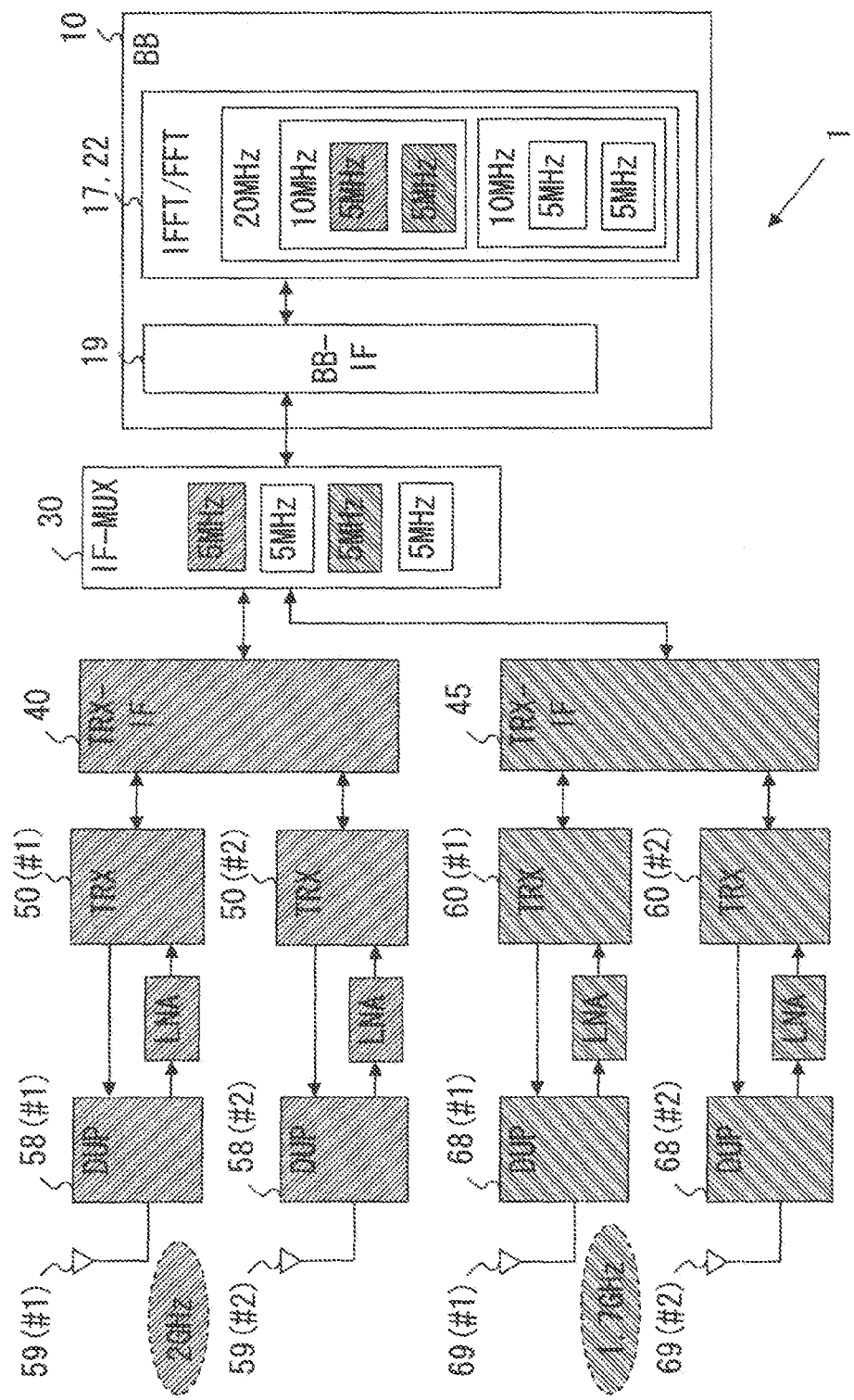
FIG. 14 is a conceptual diagram illustrating an operation image of the base station 1 in a case where frequency aggregation of the 5-MHz bandwidth in the 2-GHz band and a 5-MHz bandwidth in a 1.7-GHz band is used.

At this time, the units of the base station 1 operate as illustrated in FIG. 14. FIG. 14 is a conceptual diagram illustrating an operation image of the base station 1 in a case where frequency aggregation with respect to the 5-MHz bandwidth in the 2-GHz band and the 5-MHz bandwidth in the 1.7-GHz band is used. In this case, the hatched units of FIG. 14 function.

Specifically, the IFFT units 17 (#1) and (#2) of the BB unit 10 of the base station 1 operate, and the IFFT size of 512 is set therein. Two lines of baseband OFDM signals generated in the BB unit 10 are sent from the IF-MUX unit 30 to the TRX-IF unit 40 by using the CPRI, and then sent to the TRX units 50 (#1) and (#2) that generate 2-GHz band radio signals, and to the TRX units 60 (#1) and (#2) that generate 1.7-GHz band radio signals. The TRX units 50 (#1) and (#2) up-convert the baseband OFDM signals generated via the IFFT unit 17 (#1) into signals having the 2-GHz band carrier frequency, and radiate the resultant signals through the antennas 59 (#1) and (#2), respectively. Meanwhile, the TRX units 60 (#1) and (#2) up-convert the baseband OFDM signals generated via the IFFT unit 17 (#2) into signals having the 1.7-GHz band carrier frequency, and radiate the resultant signals through the antennas 69 (#1) and (#2), respectively.

When the mobile terminal 5 has received the 2-GHz band radio signals and the 1.7-GHz band radio signals through the antennas 89 (#1) and (#2), the reception signals are sent to the TRX units 85 (#1) and (#2), and the TRX units 86 (#1) and (#2), respectively. The TRX units 85 and 86 down-convert the reception signals, to thereby convert the reception signals into baseband signals, and send the baseband signals to the BB unit 82, respectively. In the BB unit 82, the FFT unit 122 (#1) and (#2) operate. The FFT unit 122 (#1) and (#2) perform FFT processing on the baseband signals, the demapping unit 124 demodulates the signals obtained through the FFT processing, and the decoding unit 125 decodes the signals, to thereby obtain user data.

Figure 15:
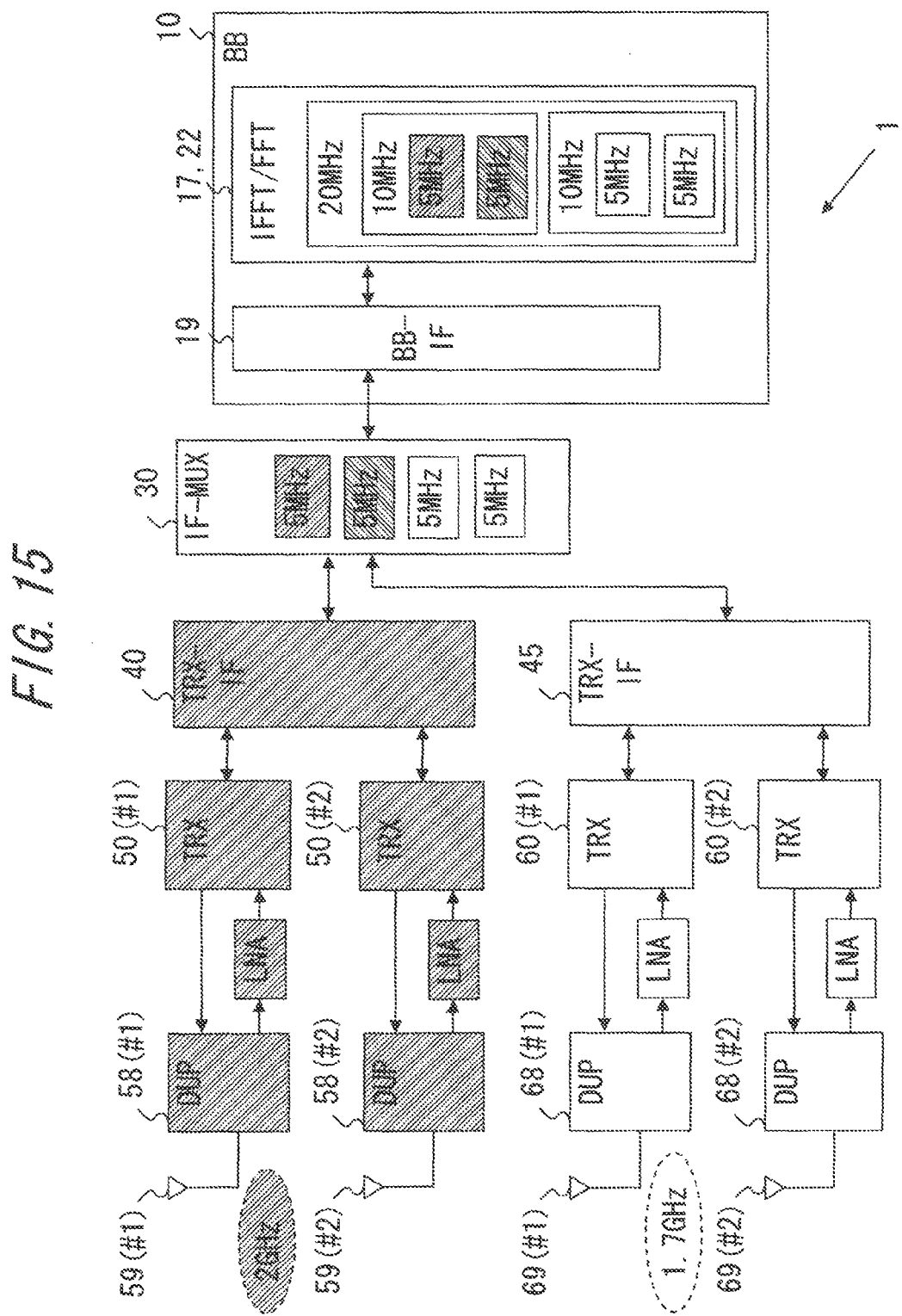
FIG. 15 is a conceptual diagram illustrating an operation image of the base station 1 in a case where a radio resource with 5-MHz bandwidth is added to the 2-GHz band so that a 10-MHz bandwidth is obtained.

Needless to say, the base station 1 of the first embodiment may operate so as to add a radio resource (bandwidth to be used) within one frequency band as in the conventional case, instead of performing the frequency aggregation as illustrated in FIG. 14 described above. FIG. 15 is a conceptual diagram illustrating an operation image of the base station 1 in a case where a radio resource with 5-MHz bandwidth is added to the 2-GHz band so that a 10-MHz bandwidth is obtained. In this case, the hatched units of FIG. 15 function.

As described above, the base station 1 of the first embodiment may implement the same device for the case where the frequency aggregation is used and for the conventional case where the continuous band is used.

Actions and Effects of First Embodiment

Hereinafter, description is given of actions and effects of the mobile communication system according to the first embodiment described above.

In the mobile communication system according to the first embodiment, the frequency aggregation is performed, to thereby secure a radio resource to be used between the base station 1 and the mobile terminal 5. Specifically, for wireless communication between the base station 1 and the mobile terminal 5, a radio resource obtained by aggregating predetermined bandwidths in different frequency bands is used.

According to this embodiment, it is possible to realize high-speed transmission of the same level as in the case where the continuous band is used by aggregating different idle frequency bands for use without securing any continuous frequency in the same frequency band. Accordingly, the bands used for communication services that are being operated by using the existing communication scheme can be secured without any change, and thus it is possible to realize high-speed transmission without affecting the existing 3 G communication services.

The base station 1 and the mobile terminal 5 of the first embodiment implement such frequency aggregation in the BB units 10 and 82, respectively. The BB unit is provided with the functional groups for generating baseband OFDM signals (S/P conversion units, IFFT units, FFT units, and P/S conversion units) for each of the different available frequency bands (for example, 800 MHz, 1.7 GHz, and 2 GHz) to be subjected to the frequency aggregation. Each of the functional groups has settings (IFFT size, FFT size, and the like) made thereto depending on the bandwidth used in each frequency band.

According to this embodiment, with this configuration, the BB unit can be shared even in a case where carrier frequency bands to be handled are different from each other.

In the base station 1, the respective baseband OFDM signal generated in the BB unit 10 and corresponding to each carrier frequency band is sent to the IF-MUX unit 30, and the IF-MUX unit 30 assigns the baseband OFDM signal to the TRX unit 50 or 60 that corresponds to its carrier frequency band. In the mobile terminal 5, the BB-IF unit 119 of the BB unit 82 performs the same assignment processing as the IF-MUX unit 30 of the base station 1.

According to this embodiment, the BB unit can be shared also in providing the signal assignment function to the IF-MUX unit 30. Conventionally, in a case where the carrier frequency bands are different from each other, it is necessary to provide a radio signal processing functional units group and a BB unit for each of the carrier frequency bands. In contrast, the BB unit can be shared in this embodiment, and accordingly device scales of the base station 1 and the mobile terminal 5 can be reduced, which in turn results in higher cost efficiency.

Such a configuration can further implement a single device for the case where carrier frequency bands are different from each other and for the case where carrier frequency bands are continuous.

Further, as described above, the same BB unit can process different frequency bands, and accordingly, even in a case of handover between different frequency bands, instantaneous interruption that may be caused by the switching can be prevented.

Further, in the base station 1 of this embodiment, the shared BB unit 10 is provided with the scheduler 20. Accordingly, even in a case where a plurality of different frequency bands are handled with regard to radio resource management, which is a function of the scheduler 20, the frequency band and bandwidth to be used can be freely set. The scheduler 20 can in turn perform allocation for enabling appropriate and high-speed data transmission depending on a propagation environment and a resource distribution status of each cell.

Further, in the base station 1, the TRX-IF unit 40 and the IF-MUX unit 30 use the interface such as the CPRI for connection between the BB unit and the TRX units. With regard to the CPRI, the conventional bit format can be followed and used, and accordingly the interface specification can be shared.

Second Embodiment

Next, a mobile communication system according to a second embodiment is described below. In the base station 1 of the first embodiment described above, the units of the BB unit 10 are shared irrespective of the carrier frequency bands, and the IF-MUX unit 30 and the TRX-IF units 40 and 45, which are provided between the BB unit 10 and the TRX units 50 and 60, assign the transmission signals based on their carrier frequency bands. In the second embodiment, the function of assignment based on the carrier frequency bands is provided to the BB unit 10 of the base station 1. It should be noted that the communication scheme executed in the mobile communication system according to the second embodiment is the same as the communication scheme of the first embodiment, which has been described in [Overview of communication scheme of first embodiment].

[Device Configuration]

In the mobile communication system according to the second embodiment, the function of the base station 1 is different from that of the first embodiment. Hereinafter, description is given of a configuration of the base station 1 of the second embodiment focusing on the units different from that of the first embodiment. It should be noted that description of the same units as those of the first embodiment is omitted herein.

<Base Station>

Figure 16:
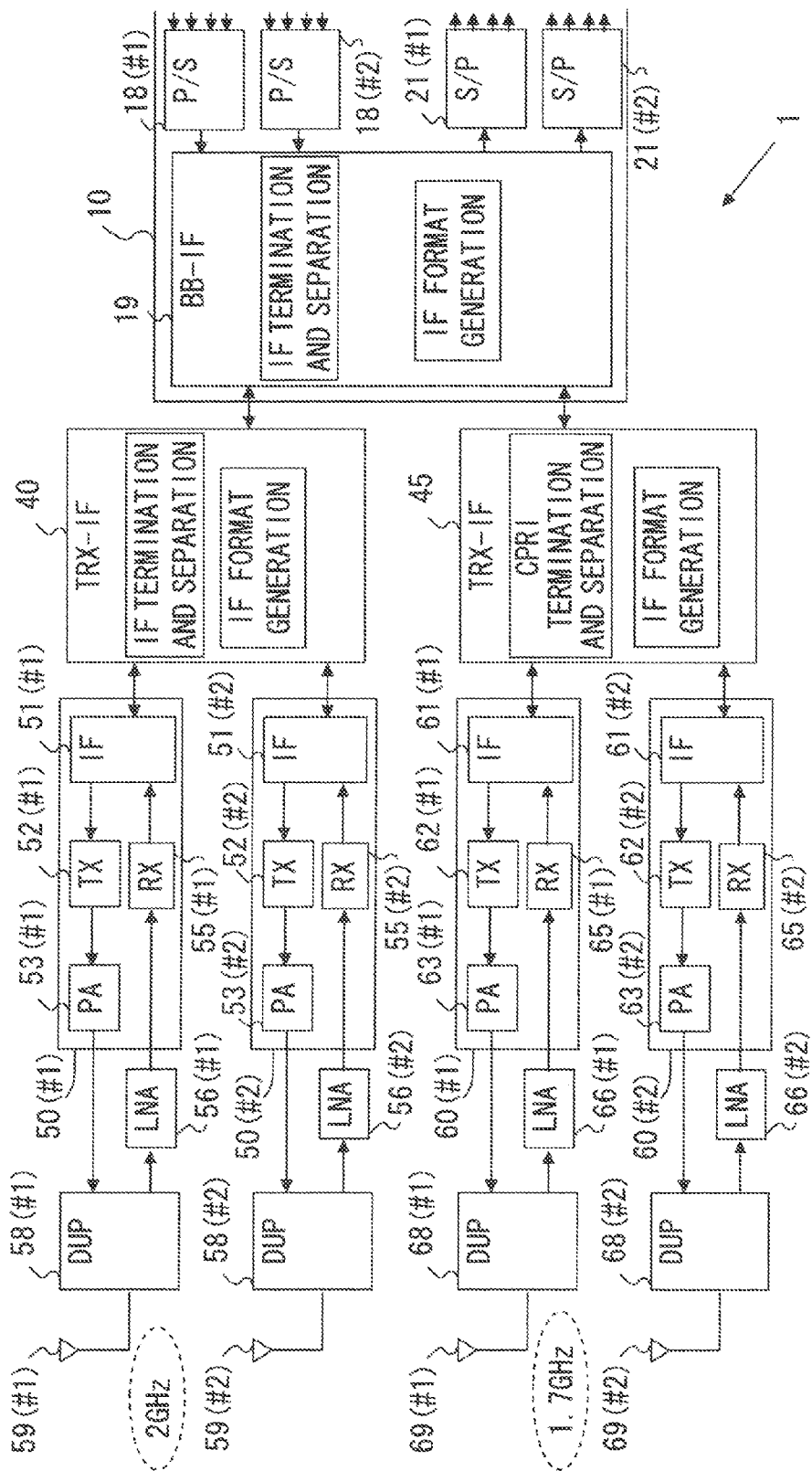
FIG. 16 is a block diagram illustrating part of a configuration of a base station according to a second embodiment.

FIG. 16 is a block diagram illustrating part of the configuration of the base station 1 according to the second embodiment. The difference from the base station 1 of the first embodiment resides in that the IF-MUX unit 30 is removed and the BB-IF unit 19 of the BB unit 10 is connected to the TRX-IF units 40 and 45.

With this configuration, the BB-IF unit 19 of the BB unit 10 has the same function as the IF-MUX unit 30 of the first embodiment in addition to the function thereof described above in the first embodiment. Specifically, the BB-IF unit 19 converts a baseband OFDM signal sent from the P/S conversion unit 18 into an optical interface signal, and transmits the optical interface signal to the TRX-IF unit 40 or 45 that corresponds to a carrier frequency band with which the baseband OFDM signal is to be sent.

Operation of the mobile communication system according to the second embodiment is the same as that of the first embodiment described above.

Action and Effect of Second Embodiment

In the base station 1 of the mobile communication system according to the second embodiment described above, the BB-IF unit 19 of the BB unit 10 assigns the transmission signal to the TRX units 50 or 60 that correspond to its carrier frequency band, and assigns the reception signal to the S/P conversion unit 21 (#1) or (#2) based on its carrier frequency band.

Thus, according to the second embodiment, it is possible to realize wireless communication by using the frequency aggregation without providing the IF-MUX unit 30 to the base station 10.

[Others]

<With Regard to Hardware Component and Software Component>

A hardware component refers to a hardware circuit, such as a field programmable gateway (FPGA), an application-specific integrated circuit (ASIC), a gate array, a combination of logic gates, a signal processing circuit, and an analog circuit.

A software component refers to a part (segment) for implementing the function as software, and the concept thereof does not limit a language, a development environment, and the like for implementing the software. Examples of the software component include a task, a process, a thread, a driver, firmware, a database, a table, a function, a procedure, a subroutine, predetermined part of a program code, data structure, an array, a variable, and a parameter. Those software components are implemented on one or a plurality of memories (one or a plurality of processors (for example, central processing units (CPUs) or digital signal processors (DSPs)).

It should be noted that the embodiments described above do not limit the technique of implementing the functional units, and hence the functional units may each be configured as the hardware component, the software component, or a combination thereof, by using a technique that can be realized by a person having ordinary skill in the technical field.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication apparatus, comprising a communication unit that performs wireless communication to one target communication device by simultaneously using a plurality of carrier frequency bands each having a specified bandwidth, the plurality of carrier frequency bands being discontinuous therebetween.

2. The wireless communication apparatus according to claim 1, wherein the communication unit comprises:
   a baseband processing unit that generates a first baseband multicarrier signal corresponding to a bandwidth of a first carrier frequency band among the plurality of carrier frequency bands, and a second baseband multicarrier signal corresponding to a bandwidth of a second carrier frequency among the plurality of carrier frequency bands;
   a first radio transmission unit that generates a radio signal of the first carrier frequency band based on the first baseband multicarrier signal; and
   a second radio transmission unit that generates a radio signal of the second carrier frequency band based on the second baseband multicarrier signal.

3. The wireless communication apparatus according to claim 2, wherein the baseband processing unit comprises:
   a first IFFT unit that generates a first baseband OFDM signal as the first baseband multicarrier signal by performing IFFT processing based on an IFFT size corresponding to the bandwidth of the first carrier frequency band; and
   a second IFFT unit that generates a second baseband OFDM signal as the second baseband multicarrier signal by performing IFFT processing based on an IFFT size corresponding to the bandwidth of the second carrier frequency band.

4. The wireless communication apparatus according to claim 2, further comprising an interface unit that connects the baseband processing unit to the first radio transmission unit and the second radio transmission unit by using predetermined interface signals,
   wherein the interface unit comprises:
   an assignment unit that assigns the first baseband multicarrier signal and the second baseband multicarrier signal, which are output from the baseband processing unit, to the first radio transmission unit or the second radio transmission unit based on the plurality of carrier frequency bands; and
   an interface signal generation unit that maps, based on an assignment result obtained by the assignment unit, the first baseband multicarrier signal and the second baseband multicarrier signal to the predetermined interface signals.

5. The wireless communication apparatus according to claim 2, wherein the baseband processing unit further comprises a scheduling unit that allocates a data symbol addressed to the one target communication device to at least one of the first baseband multicarrier signal and the second baseband multicarrier signal.

6. The wireless communication apparatus according to claim 5, wherein the scheduling unit further comprises a notification unit that newly allocates an idle carrier frequency band among the plurality of carrier frequency bands as a radio resource for the one target communication device, and notifies the one target communication device of band information on the newly allocated idle carrier frequency band.

7. The wireless communication apparatus according to claim 2, wherein the baseband processing unit further comprises a control unit that receives, from the one target communication device, a notification regarding band information on a newly allocated carrier frequency band among the plurality of carrier frequency bands, and performs specified setting on generation of the first baseband multicarrier signal and the second baseband multicarrier signal based on the newly allocated band information.

8. A wireless communication method, comprising:
   performing wireless communication to one target communication device by simultaneously using a plurality of carrier frequency bands each having a specified bandwidth, the plurality of carrier frequency bands being discontinuous therebetween.

9. The wireless communication method according to claim 8, wherein the performing wireless communication includes:
   generating a first baseband multicarrier signal corresponding to a bandwidth of a first carrier frequency band among the plurality of carrier frequency bands, and a second baseband multicarrier signal corresponding to a bandwidth of a second carrier frequency among the plurality of carrier frequency bands;
   generating a radio signal of the first carrier frequency band based on the first baseband multicarrier signal; and
   generating a radio signal of the second carrier frequency band based on the second baseband multicarrier signal.

10. The wireless communication method according to claim 9, wherein the generating the first-and-second baseband multicarrier signals includes:
    generating a first baseband OFDM signal as the first baseband multicarrier signal by performing IFFT processing based on an IFFT size corresponding to the bandwidth of the first carrier frequency band; and
    generating a second baseband OFDM signal as the second baseband multicarrier signal by performing IFFT processing based on an IFFT size corresponding to the bandwidth of the second carrier frequency band.

11. The wireless communication method according to claim 9, wherein the generating the first-and-second baseband multicarrier signals further including:
    assigning the first baseband multicarrier signal and the second baseband multicarrier signal to the generating the radio signal of the first carrier frequency band or the generating the radio signal of the second carrier frequency band based on the plurality of carrier frequency bands; and mapping, based on the assignment result, the first baseband multicarrier signal and the second baseband multicarrier signal to a predetermined interface signals.

12. The wireless communication method according to claim 9, wherein the generating the first-and-second baseband multicarrier signals further includes:
allocating a data symbol addressed to the one target communication device to at least one of the first baseband multicarrier signal and the second baseband multicarrier signal.

13. The wireless communication method according to claim 12, wherein the allocating the data symbol further includes:
newly allocating an idle carrier frequency band among the plurality of carrier frequency bands as a radio resource for the one target communication device; and
notifying the one target communication device of band information on the newly allocated idle carrier frequency band.

14. The wireless communication method according to claim 9, wherein the generating the first-and-second baseband multicarrier signals further includes:
receiving, from the one target communication device, a notification regarding band information on a newly allocated carrier frequency band among the plurality of carrier frequency bands; and
performing specified setting on generation of the first baseband multicarrier signal and the second baseband multicarrier signal based on the newly allocated band information.

* * * * *